United States Patent
Kesho et al.

(10) Patent No.: US 9,019,439 B2
(45) Date of Patent: Apr. 28, 2015

(54) LIQUID CRYSTAL DISPLAY DEVICE

(71) Applicants: Masato Kesho, Kanazawa (JP);
Masanobu Nonaka, Nonoichi (JP);
Kazuhiro Takahashi, Kanazawa (JP);
Toshimasa Yonekura, Kanazawa (JP)

(72) Inventors: Masato Kesho, Kanazawa (JP);
Masanobu Nonaka, Nonoichi (JP);
Kazuhiro Takahashi, Kanazawa (JP);
Toshimasa Yonekura, Kanazawa (JP)

(73) Assignee: Japan Display Inc., Tokyo (JP)

( * ) Notice: Subject to any disclaimer, the term of this patent is extended or adjusted under 35 U.S.C. 154(b) by 253 days.

(21) Appl. No.: 13/645,734

(22) Filed: Oct. 5, 2012

(65) Prior Publication Data
US 2013/0093986 A1 Apr. 18, 2013

(30) Foreign Application Priority Data

Oct. 14, 2011 (JP) .................................. 2011-226976
Oct. 28, 2011 (JP) .................................. 2011-237428

(51) Int. Cl.
*G02F 1/1343* (2006.01)
*G02F 1/1362* (2006.01)

(52) U.S. Cl.
CPC ............... *G02F 1/134309* (2013.01); *G02F 2001/134318* (2013.01); *G02F 2001/136218* (2013.01)

(58) Field of Classification Search
None
See application file for complete search history.

(56) References Cited

U.S. PATENT DOCUMENTS

| 6,266,116 | B1 | 7/2001 | Ohta et al. |
| 7,944,513 | B2 | 5/2011 | Ishii |
| 2001/0010575 | A1* | 8/2001 | Yoshida et al. ............... 349/141 |
| 2004/0165136 | A1 | 8/2004 | Sugiyama et al. |
| 2005/0206824 | A1 | 9/2005 | Son et al. |
| 2005/0219453 | A1 | 10/2005 | Kubo et al. |
| 2007/0115234 | A1 | 5/2007 | Kim et al. |
| 2008/0062358 | A1 | 3/2008 | Lee et al. |
| 2008/0180590 | A1 | 7/2008 | Lee et al. |
| 2008/0180623 | A1 | 7/2008 | Lee et al. |
| 2008/0186439 | A1 | 8/2008 | Kwon et al. |
| 2011/0181805 | A1 | 7/2011 | Nagami |

FOREIGN PATENT DOCUMENTS

| JP | 6-222397 | 8/1994 |
| JP | 7-159807 | 6/1995 |

(Continued)

OTHER PUBLICATIONS

U.S. Appl No. 13/676,566, filed Nov. 14, 2012, Kesho, et al.

(Continued)

*Primary Examiner* — Thanh-Nhan P Nguyen
(74) *Attorney, Agent, or Firm* — Oblon, McClelland, Maier & Neustadt, L.L.P.

(57) ABSTRACT

According to one embodiment, a liquid crystal display device includes a first substrate including a first gate line and a second gate line, a semiconductor layer, a gate electrode electrically connected to the first gate line, a source electrode which contacts the semiconductor layer and which is electrically connected to a first source line, and a drain electrode including a first electrode portion which contacts the semiconductor layer, a second electrode portion which is connected to the first gate line side of the first electrode portion, and a third electrode portion which is connected to the second gate line side of the first electrode portion, a second substrate including a common electrode, and a liquid crystal layer between the first substrate and the second substrate.

16 Claims, 24 Drawing Sheets

(56) References Cited

FOREIGN PATENT DOCUMENTS

| | | |
|---|---|---|
| JP | 9-160041 | 6/1997 |
| JP | 9-160042 | 6/1997 |
| JP | 9-160061 | 6/1997 |
| JP | 10-26765 | 1/1998 |
| JP | 10-90708 | 4/1998 |
| JP | 10-232392 | 9/1998 |
| JP | 2000-81641 | 3/2000 |
| JP | 2004-12730 | 1/2004 |
| JP | 2005-3802 | 1/2005 |
| JP | 3644653 | 2/2005 |
| JP | 2005-242307 | 9/2005 |
| JP | 2006/133783 | 5/2006 |
| JP | 2009-42630 | 2/2009 |
| JP | 2009-192822 | 8/2009 |
| JP | 2009-276588 | 11/2009 |
| WO | WO 99/10530 | 3/1999 |
| WO | WO 2010/058635 A1 | 5/2010 |

OTHER PUBLICATIONS

U.S. Appl. No. 13/548,644, filed Jul. 13, 2012, Kesho, et al.
U.S. Appl. No. 13/589,597, filed Aug. 20, 2012, Yonekura, et al.
U.S. Appl. No. 13/590,643, filed Aug. 21, 2012, Kesho, et al.
U.S. Appl. No. 13/603,942, filed Sep. 5, 2012, Kesho, et al.
U.S. Appl. No. 13/614,344, filed Sep. 13, 2012, Kesho, et al.
Office Action issued Jan. 6, 2015 in Japanese Patent Application No. 2011-226976 (with English translation).

* cited by examiner

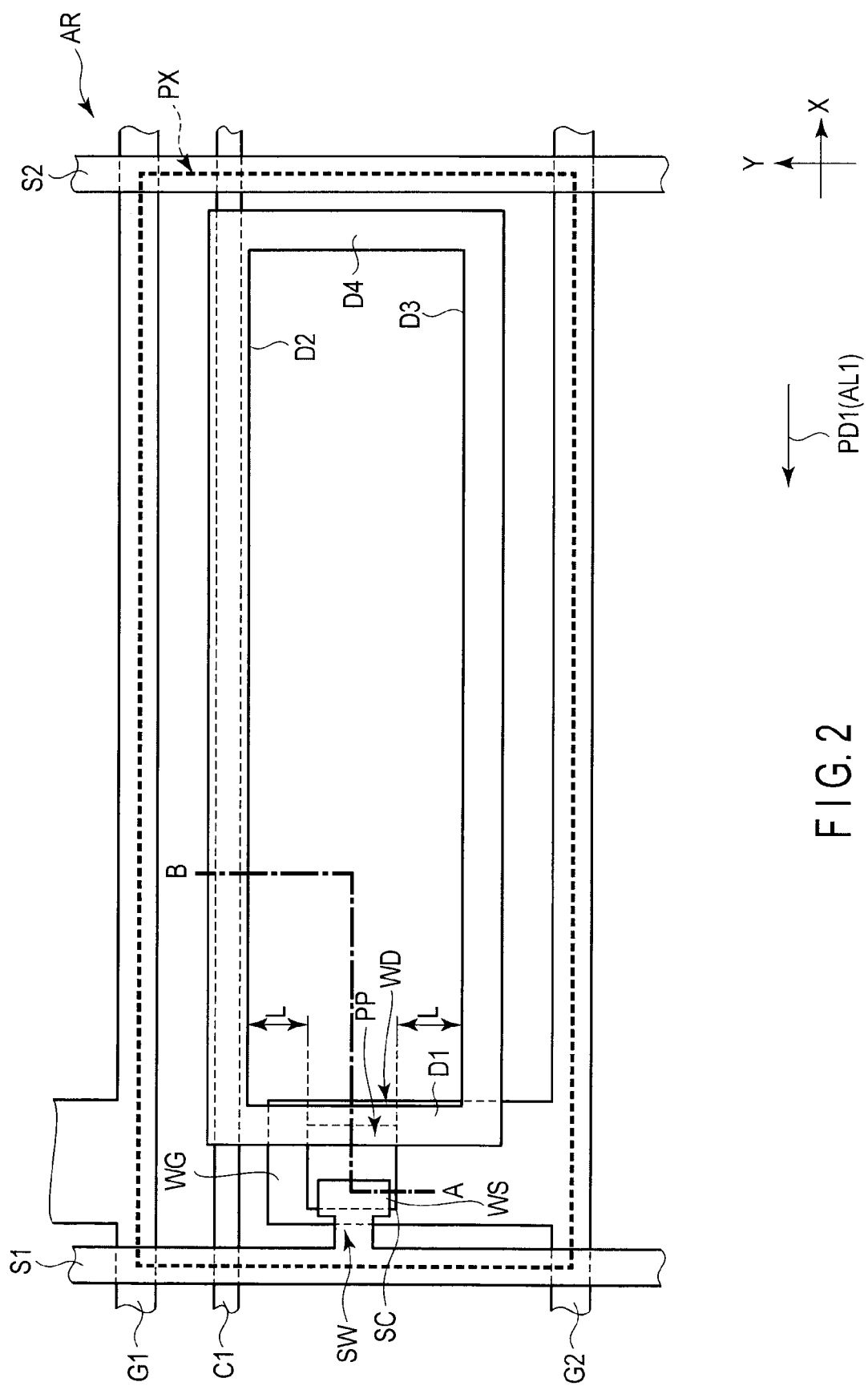
F I G. 2

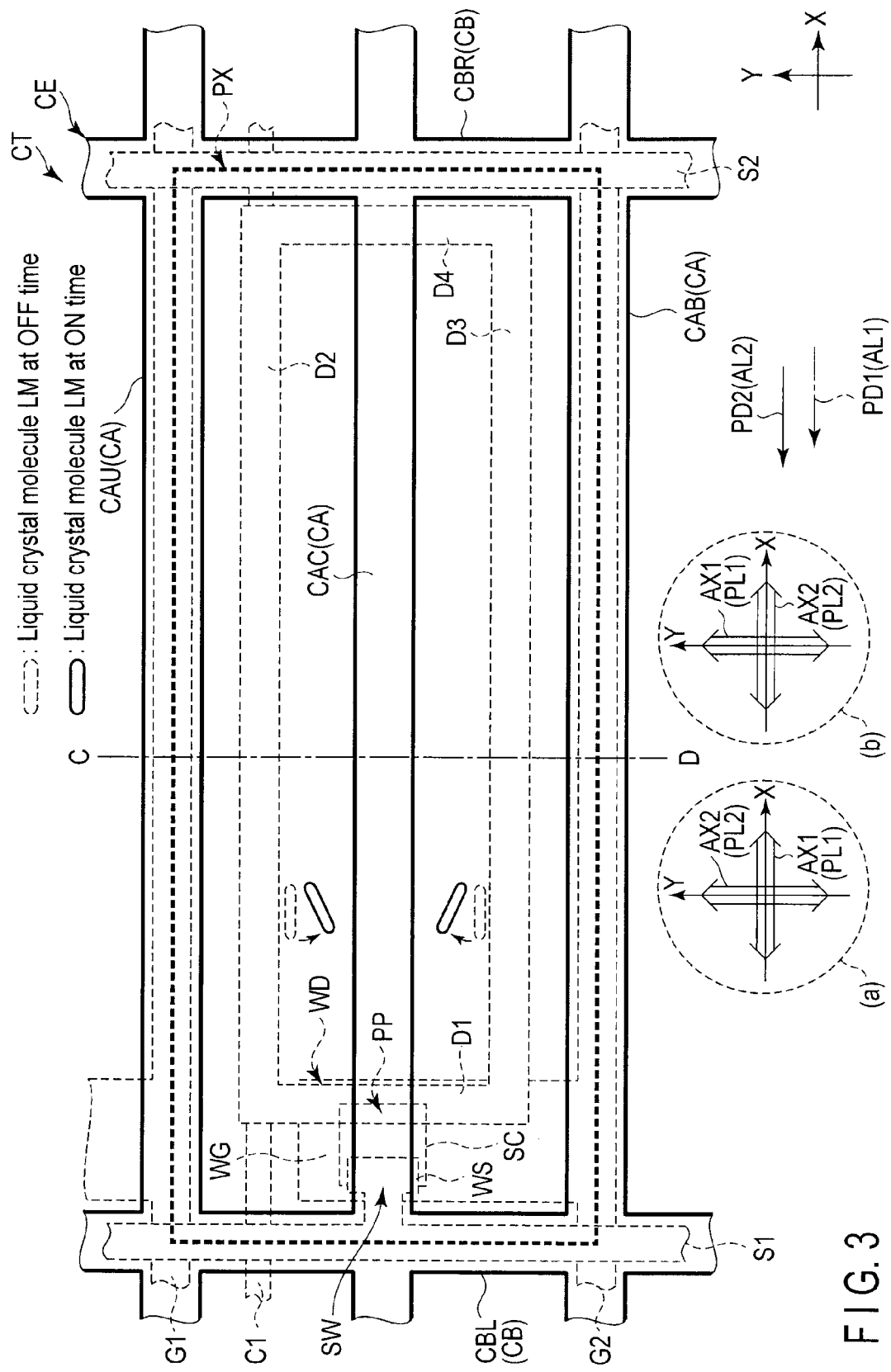
F I G. 3

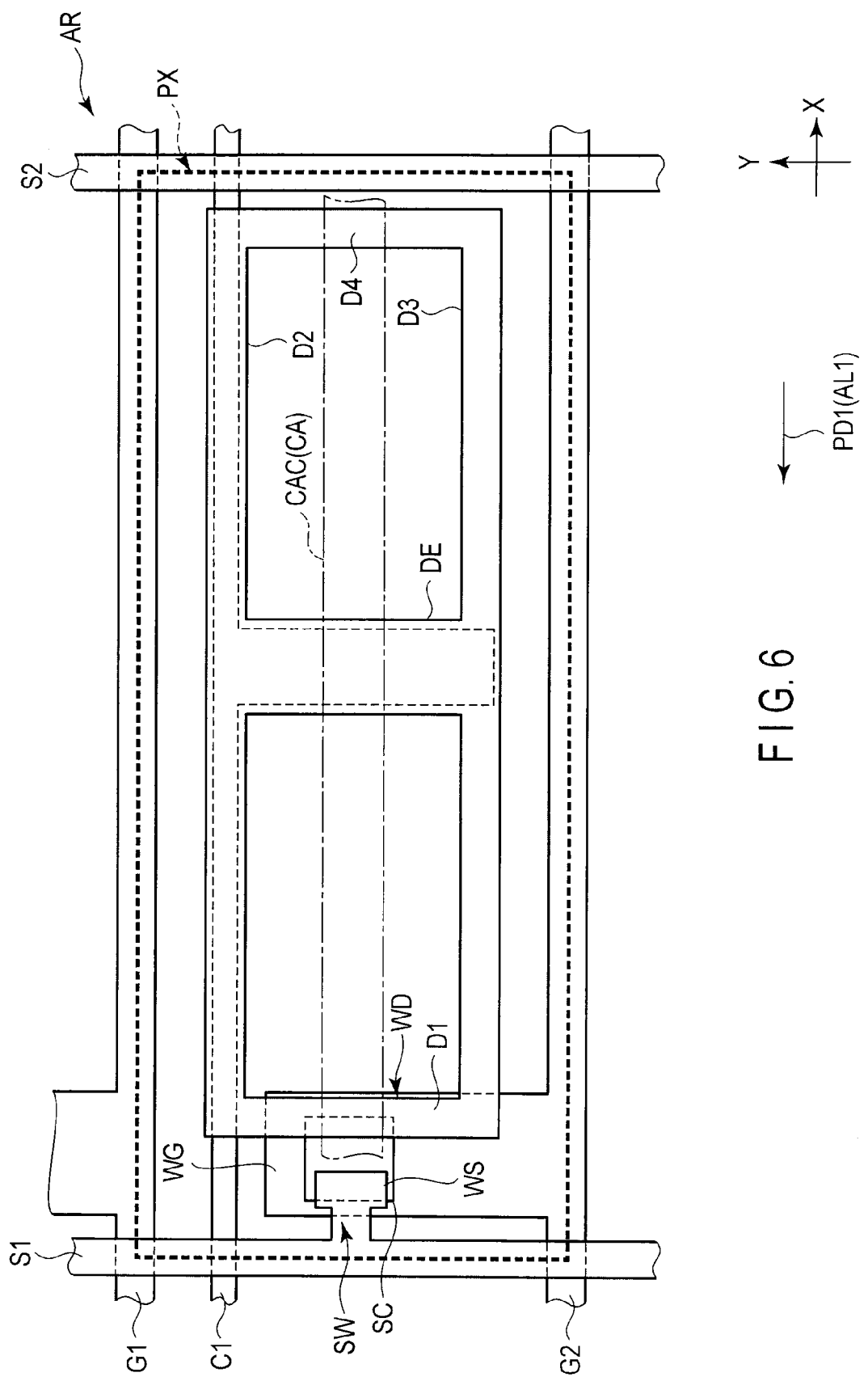
F I G. 6

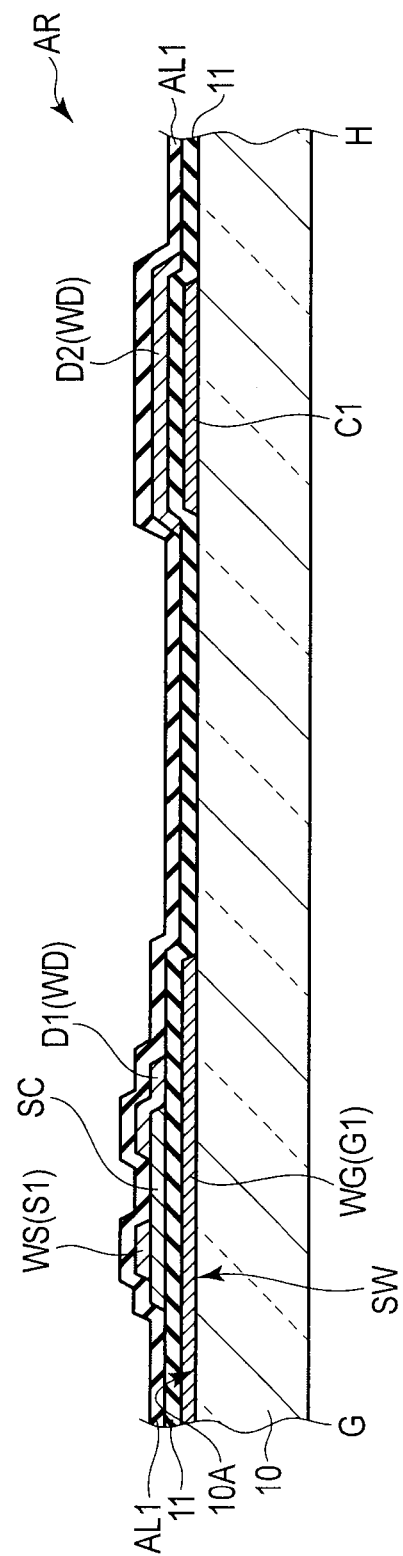
F I G. 16

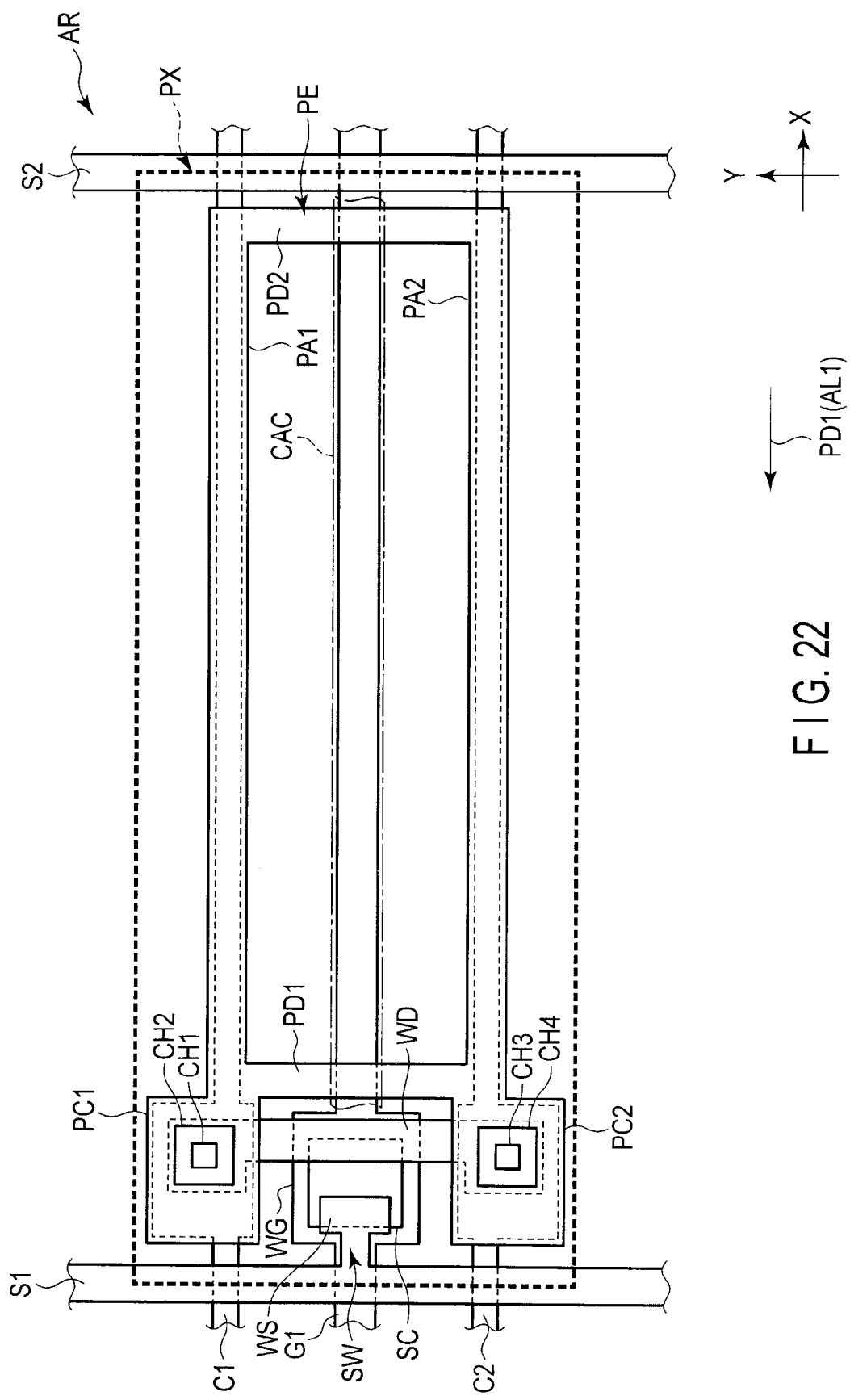
F I G. 22

LIQUID CRYSTAL DISPLAY DEVICE

CROSS-REFERENCE TO RELATED APPLICATIONS

This application is based upon and claims the benefit of priority from Japanese Patent Applications No. 2011-226976, filed Oct. 14, 2011; and No. 2011-237428, filed Oct. 28, 2011, the entire contents of all of which are incorporated herein by reference.

FIELD

Embodiments described herein relate generally to a liquid crystal display device.

BACKGROUND

In recent years, flat-panel display devices have been vigorously developed. By virtue of such advantageous features as light weight, small thickness and low power consumption, special attention has been paid to liquid crystal display devices among others. In particular, in active matrix liquid crystal devices in which switching elements are incorporated in respective pixels, attention is paid to the configuration which makes use of a lateral electric field (including a fringe electric field), such as an IPS (In-Plane Switching) mode or an FFS (Fringe Field Switching) mode. Such a liquid crystal display device of the lateral electric field mode includes pixel electrodes and a counter-electrode, which are formed on an array substrate, and liquid crystal molecules are switched by a lateral electric field which is substantially parallel to a major surface of the array substrate.

On the other hand, there has been proposed a technique wherein a lateral electric field or an oblique electric field is produced between a pixel electrode formed on an array substrate and a counter-electrode formed on a counter-substrate, thereby switching liquid crystal molecules.

BRIEF DESCRIPTION OF THE DRAWINGS

FIG. 2 is a plan view which schematically shows a structure example of a pixel at a time when an array substrate shown in FIG. 1 is viewed from the a counter-substrate side;

FIG. 3 is a plan view which schematically shows a structure example of a pixel in a counter-substrate shown in FIG. 1;

FIG. 6 is a plan view which schematically shows another structure example of the pixel at a time when the array substrate shown in FIG. 1 is viewed from the counter-substrate side;

FIG. 16 is a schematic cross-sectional view, taken along the line G-H in FIG. 14, showing a cross-sectional structure of the array substrate;

FIG. 22 is a plan view which schematically shows another structure example of the pixel at a time when the array substrate shown in FIG. 1 is viewed from the counter-substrate side;

DETAILED DESCRIPTION

Figure 1:
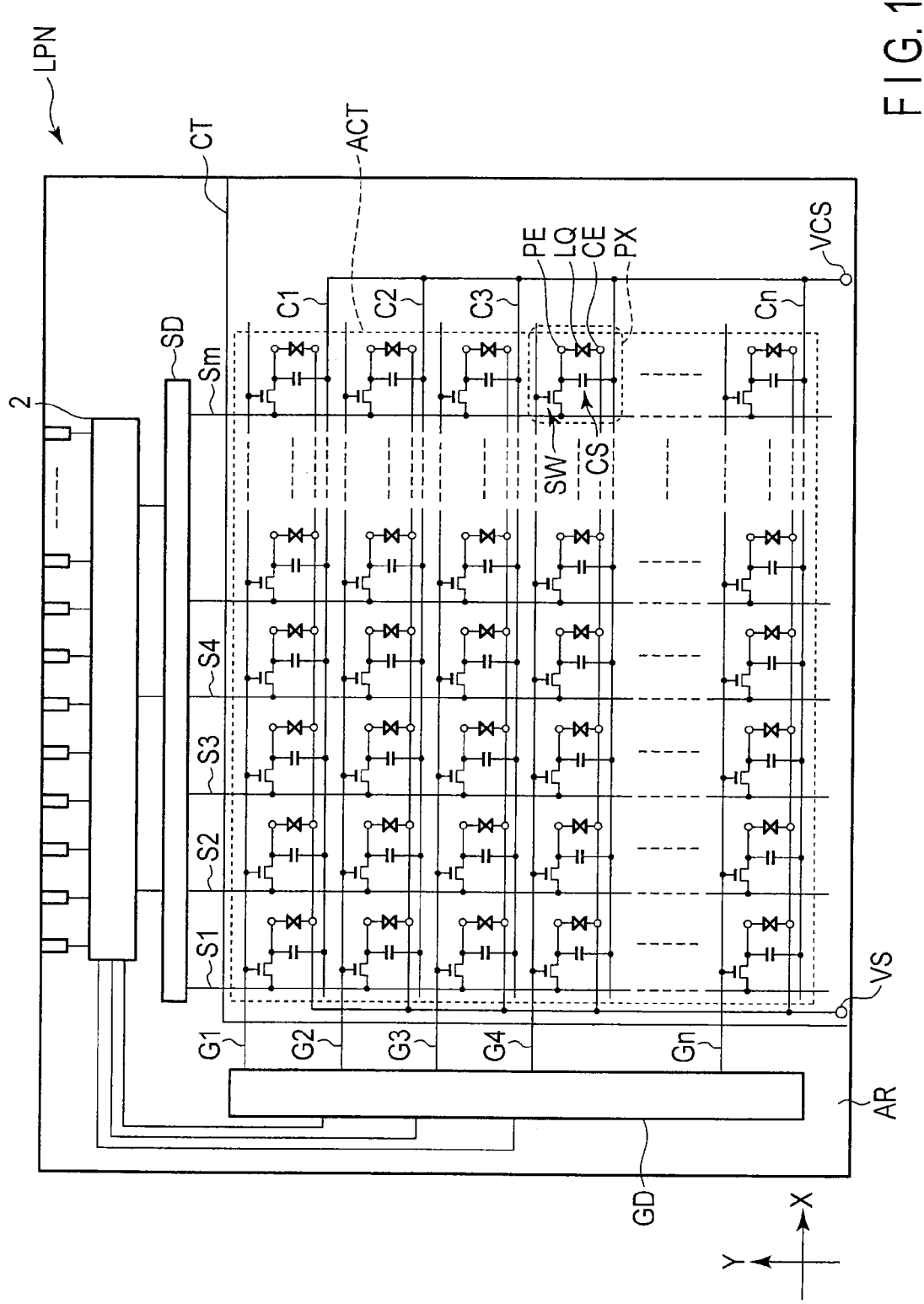
FIG. 1 is a view which schematically illustrates a structure and an equivalent circuit of a liquid crystal display apparatus according to an embodiment.

In general, according to one embodiment, a liquid crystal display device includes: a first substrate including a first gate line and a second gate line which extend in a first direction and which are disposed with a first pitch along a second direction crossing the first direction, a first source line and a second source line which extend in the second direction and which are disposed with a second pitch, which is greater than the first pitch, along the first direction, a semiconductor layer, a gate electrode electrically connected to the first gate line, a source electrode which contacts the semiconductor layer and which is electrically connected to the first source line, and a drain electrode which is formed of the same material as the first source line and the second source line, the drain electrode including a first electrode portion which contacts the semiconductor layer, a second electrode portion which is connected to the first gate line side of the first electrode portion and which extends in the first direction, and a third electrode portion which is connected to the second gate line side of the first electrode portion and which extends in the first direction; a second substrate including a common electrode, the common electrode including main common electrodes which extend in the first direction and which are located, respectively, between the second electrode portion and the third electrode portion, above the first gate line, and above the second gate line; and a liquid crystal layer including liquid crystal molecules held between the first substrate and the second substrate.

According to another embodiment, a liquid crystal display device includes: a first substrate including a gate line which extends in a first direction, a gate electrode electrically connected to the gate line, an insulation film which covers the gate line and the gate electrode, a semiconductor layer which is formed on the insulation film and which is located above the gate electrode, a source line which is formed on the insulation film and which extends in a second direction crossing the first direction, a source electrode which is electrically connected to the source line on the insulation film and which contacts the semiconductor layer, and a drain electrode which is formed on the insulation film of a pixel having a greater length in the first direction than in the second direction, the drain electrode including a first electrode portion which contacts the semiconductor layer, and a second electrode portion and a third electrode portion which are connected to the first electrode portion and which extend in the first direction; a second substrate including a common electrode, the common electrode including main common electrodes which extend in the first direction and which are located, respectively, between the second electrode portion and the third electrode portion, and above the gate line; and a liquid crystal layer including liquid crystal molecules held between the first substrate and the second substrate.

According to another embodiment, a liquid crystal display device includes: a first substrate including a first storage capacitance line and a second storage capacitance line which extend in a first direction, a gate line which is located between the first storage capacitance line and the second storage capacitance line and which extends in the first direction, a source line which extends in a second direction crossing the first direction, a semiconductor layer, a gate electrode which is electrically connected to the gate line, a source electrode which contacts the semiconductor layer and which is electrically connected to the source line, and a drain electrode including a first electrode portion which contacts the semiconductor layer, a second electrode portion which is connected to the first electrode portion and which is opposed to the first storage capacitance line and which extends in the first direction, and a third electrode portion which is connected to the first electrode portion and which is opposed to the second storage capacitance line and which extends in the first direction; a second substrate including a common electrode, the common electrode including main common electrodes which are located, respectively, on both sides of the second electrode portion and on both sides of the third electrode portion and which extend in the first direction; and a liquid crystal layer including liquid crystal molecules held between the first substrate and the second substrate.

According to another embodiment, a liquid crystal display device includes: a first substrate including a first storage capacitance line and a second storage capacitance line which extend in a first direction, a gate line which is located between the first storage capacitance line and the second storage capacitance line and which extends in the first direction, a gate electrode electrically connected to the gate line, an insulation film which covers the first storage capacitance line, the second storage capacitance line, the gate line, and the gate electrode, a semiconductor layer which is formed on the insulation film and which is located above the gate electrode, a source line which is formed on the insulation film and which extends in a second direction crossing the first direction, a source electrode which is electrically connected to the source line on the insulation film and which contacts the semiconductor layer, a drain electrode formed on the insulation film, the drain electrode including a first electrode portion which contacts the semiconductor layer, a second electrode portion which is connected to the first electrode portion and which extends in the first direction to overlap the first storage capacitance line via the insulation film, and a third electrode portion which is connected to the first electrode portion and which extends in the first direction to overlap the second storage capacitance line via the insulation film; a second substrate including a common electrode, the common electrode including main common electrodes which are located, respectively, on both sides of the second electrode portion and on both sides of the third electrode portion and which extend in the first direction; and a liquid crystal layer including liquid crystal molecules held between the first substrate and the second substrate.

Embodiments will now be described in detail with reference to the accompanying drawings. In the drawings, structural elements having the same or similar functions are denoted by like reference numerals, and an overlapping description is omitted.

FIG. 1 is a view which schematically shows a structure and an equivalent circuit of a liquid crystal display apparatus according to an embodiment.

Specifically, the liquid crystal display device includes an active-matrix-type liquid crystal display panel LPN. The liquid crystal display panel LPN includes an array substrate AR which is a first substrate, a counter-substrate CT which is a second substrate that is disposed to be opposed to the array substrate AR, and a liquid crystal layer LQ which is held between the array substrate AR and the counter substrate CT. The liquid crystal display panel LPN includes an active area ACT which displays an image. The active area ACT is composed of a plurality of pixels PX which are arranged in a matrix of m×n (m and n are positive integers).

The liquid crystal display panel LPN includes, in the active area ACT, an n-number of gate lines G (G1 to Gn), an n-number of storage capacitance lines C (C1 to Cn), and an m-number of source lines S (S1 to Sm). The gate lines G and storage capacitance lines C correspond to signal lines which extend, for example, substantially linearly in a first direction X. The gate lines G and storage capacitance lines C neighbor at intervals along a second direction Y crossing the first direction X, and are alternately arranged in parallel. In this example, the first direction X and the second direction Y are substantially perpendicular to each other. The source lines S cross the gate lines G and storage capacitance lines C. The source lines S correspond to signal lines which extend substantially linearly along the second direction Y. It is not always necessary that each of the gate lines G, storage capacitance lines C and the source lines S extend linearly, and a part thereof may be bent.

Each of the gate lines G is led out to the outside of the active area ACT and is connected to a gate driver GD. Each of the source lines S is led out to the outside of the active area ACT and is connected to a source driver SD. At least parts of the gate driver GD and source driver SD are formed on, for example, the array substrate AR, and are connected to a driving IC chip 2 which incorporates a controller.

Each of the pixels PX includes a switching element SW, a pixel electrode PE, and a common electrode CE. A storage capacity CS is formed, for example, between the storage capacitance line C and the pixel electrode PE. The storage capacitance line C is electrically connected to a voltage application module VCS to which a storage capacitance voltage is applied.

In the present embodiment, the liquid crystal display panel LPN is configured such that the pixel electrodes PE are formed on the array substrate AR, and at least a part of the common electrode CE is formed on the counter-substrate CT, and liquid crystal molecules of the liquid crystal layer LQ are switched by mainly using an electric field which is produced between the pixel electrode PE and the common electrode CE. The electric field, which is produced between the pixel electrode PE and the common electrode CE, is an oblique electric field which is slightly inclined to an X-Y plane, which is defined by the first direction X and second direction Y, or to a substrate major surface (or a lateral electric field which is substantially parallel to the substrate major surface).

The switching element SW is composed of, for example, an n-channel thin film transistor (TFT). The switching element SW is electrically connected to the gate line G and source line S. The switching element SW may be of a top gate type or a bottom gate type. In addition, a semiconductor layer of the switching element SW is formed of, for example, amorphous silicon, but it may be formed of polysilicon.

The pixel electrodes PE are disposed in the respective pixels PX, and are electrically connected to the switching elements SW. Although described later in detail, in the present embodiment, a drain electrode of the switching element SW may function as the pixel electrode PE, or a pixel electrode PE electrically connected to the drain electrode may be additionally provided. In the configuration in which the drain electrode functions as the pixel electrode PE, the pixel electrode PE is formed of a wiring material, an opaque electrically conductive material, or a light-blocking or reflective electrically conductive material. By way of example, the pixel electrode PE is formed of at least one of metallic materials selected from the group consisting of aluminum (Al), titanium (Ti), silver (Ag), molybdenum (Mo), tungsten (W), copper (Cu) and chromium (Cr), or formed of an alloy including one of these metallic materials. When the pixel electrode PE is provided separately from the drain electrode, the pixel electrode PE may be formed of a light-transmissive electrically conductive material such as indium tin oxide (ITO) or indium zinc oxide (IZO), or may be formed of the above-mentioned wiring material.

The common electrode CE is disposed common to the pixel electrodes PE of plural pixels PX via the liquid crystal layer LQ. The common electrode CE may be formed of a light-transmissive electrically conductive material such as ITO or IZO, or may be formed of the above-mentioned wiring material.

The array substrate AR includes a power supply module VS for applying a voltage to the common electrode CE. This power supply module VS is formed, for example, on the outside of the active area ACT. The common electrode CE of the counter-substrate CT is led out to the outside of the active area ACT, and is electrically connected to the power supply module VS via an electrically conductive member (not shown).

FIG. 2 is a plan view which schematically shows a structure example of one pixel PX at a time when the array substrate AR shown in FIG. 1 is viewed from the counter-substrate side. FIG. 2 is a plan view in an X-Y plane.

The array substrate AR includes a gate line G1, a gate line G2, a storage capacitance line C1, a source line S1, a source line S2, a switching element SW, and a first alignment film AL1.

In the example illustrated, as indicated by a broken line in FIG. 2, the pixel PX has a laterally elongated rectangular shape having a greater length in the first direction X than in the second direction Y. The gate line G1 and gate line G2 are disposed with a first pitch along the second direction Y, and each of the gate line G1 and gate line G2 extends in the first direction X. The storage capacitance line C1 is disposed between the gate line G1 and gate line G2, and extends in the first direction X. The source line S1 and source line S2 are disposed with a second pitch along the first direction X, and extend in the second direction Y.

In the pixel PX illustrated, the source line S1 is disposed at a left side end portion, the source line S2 is disposed at a right side end portion, the gate line G1 is disposed at an upper side end portion, and the gate line G2 is disposed at a lower side end portion. Strictly speaking, the source line S1 is disposed to extend over a boundary between the pixel PX and a pixel neighboring on the left side, the source line S2 is disposed to extend over a boundary between the pixel PX and a pixel neighboring on the right side, the gate line G1 is disposed to extend over a boundary between the pixel PX and a pixel neighboring on the upper side, and the gate line G2 is disposed to extend over a boundary between the pixel PX and a pixel neighboring on the lower side. Specifically, the length of the pixel PX in the first direction X corresponds to the second pitch between the source lines, and the length of the pixel PX in the second direction Y corresponds to the first pitch between the gate lines. The first pitch is less than the second pitch.

In addition, in the pixel PX illustrated, the storage capacitance line C1 is located with such an eccentricity as to be closer to the gate line G1 than to the gate line G2. Specifically, the distance in the second direction Y between the storage capacitance line C1 and the gate line G1 is less than the distance in the second direction Y between the storage capacitance line C1 and the gate line G2.

The switching element SW is located in the vicinity of the source line S1, specifically, in the vicinity of the left side end portion of the pixel PX in the example illustrated, and is electrically connected to the gate line G2 and the source line S1. The switching element SW includes a gate electrode WG which is electrically connected to the gate line G2, a semiconductor layer SC which is formed of amorphous silicon immediately above the gate electrode WG, a source electrode WS which is electrically connected to the source line S1 and is put in contact with the semiconductor layer SC, and a drain electrode WD which is put in contact with the semiconductor layer SC. In the example illustrated, the gate electrode WG is formed integral with the gate line G2, and the source electrode WS is formed integral with the source line S1. A part of the source electrode WS which is put in contact with the source line S1 extends along the second direction Y.

The drain electrode WD is disposed between the source line S1 and source line S2 which neighbor each other, and between the gate line G1 and gate line G2. Specifically, the drain electrode WD is located within an inside surrounded by the source line S1 and source line S2 and by the gate line G1 and gate line G2. The drain electrode WD also has a function as the pixel electrode PE.

The drain electrode WD includes a first electrode portion D1 which is put in contact with the semiconductor layer SC, a second electrode portion D2 which is connected to the gate line G1 side of the first electrode portion D1 and which extends along the first direction X, and a third electrode portion D3 which is connected to the gate line G2 side of the first electrode portion D1 and which extends along the first direction X. In the example illustrated, the drain electrode WD further includes a fourth electrode portion D4 which is connected to the second electrode portion D2 and third electrode portion D3 and which extends along the second direction Y. The first electrode portion D1, second electrode portion D2, third electrode portion D3 and fourth electrode portion D4 are formed integral or continuous with one another, and are electrically connected to one another.

The first electrode portion D1 is located in the vicinity of the left side end portion of the pixel PX, and linearly extends along the second direction Y. A part of the first electrode portion D1, in particular, a part (contact position) located at a substantially equal distance from the second electrode portion D2 and third electrode portion D3 contacts the semiconductor layer SC. Specifically, a distance L in the second direction Y from a contact position PP where the drain electrode WD contacts the semiconductor layer SC to the second electrode portion D2 is substantially equal to a distance L in the second direction Y from the contact position PP to the third electrode portion D3. The part of the first electrode portion D1 which contacts the semiconductor layer SC is substantially parallel to the part of the source electrode WS which contacts the semiconductor layer SC, and extends along the second direction Y. The first electrode portion D1 is formed in a strip shape having a substantially uniform width in the first direction X.

The second electrode portion D2 and third electrode portion D3 linearly extend from the first electrode portion D1 along the first direction X. Specifically, each of the second electrode portion D2 and third electrode portion D3 extends along the first direction X from the vicinity of the left side end portion (i.e. the source line S1 side) of the pixel PX to the vicinity of the right side end portion (i.e. the source line S2 side). The second electrode portion D2 and third electrode portion D3 are formed in a strip shape having a substantially uniform width in the second direction Y.

The fourth electrode portion D4 is located in the vicinity of the right side end portion of the pixel PX, and linearly extends along the second direction Y. The fourth electrode portion D4 is formed in a strip shape having a substantially uniform width in the first direction X.

In the example illustrated, the first electrode portion D1 is connected to one end portion of each of the second electrode portion D2 and third electrode portion D3 on the source line S1 side of the pixel PX. The fourth electrode portion D4 is connected to the other end portion of each of the second electrode portion D2 and third electrode portion D3 on the source line S2 side of the pixel PX. The drain electrode WD having such a configuration is in the shape of a rectangular frame. Specifically, the drain electrode WD is formed in a loop shape. However, the fourth electrode portion D4 may be omitted.

In the drain electrode WD, the second electrode portion D2 is located above the storage capacitance line C1. Specifically, the storage capacitance line C1 is located immediately below the second electrode portion D2. The drain electrode WD is opposed to the storage capacitance line C1 in the second electrode portion D2, and forms a capacitance necessary for image display in the pixel PX. In the example illustrated, the storage capacitance line C1 passes immediately below the second electrode portion D2 and linearly extends along the first direction X. However, in order to form a higher capacitance, the storage capacitance line C1 may extend immediately below the third electrode portion D3 and fourth electrode portion D4 as well as the second electrode portion D2. Nevertheless, it is preferable that the storage capacitance line C1 extends immediately below the drain electrode WD without running out of the drain electrode WD so that the area of a transmissive region in the pixel PX may not be reduced.

The array substrate AR may further include a part of the common electrode CE.

In the array substrate AR, the drain electrode WD is covered with the first alignment film AL1. The first alignment film AL1 is subjected to alignment treatment (e.g. rubbing treatment or optical alignment treatment) in a first alignment treatment direction PD1 for initially aligning the liquid crystal molecules of the liquid crystal layer LQ. The first alignment treatment direction PD1, in which the first alignment film AL1 initially aligns the liquid crystal molecules, is substantially parallel to the first direction X.

Examples of dimensions are described. The first pitch of gate lines G, i.e. the distance between the gate line G1 and gate line G2 in the second direction Y, is 50 μm to 60 μm. The second pitch of source lines S, i.e. the distance between the source line S1 and source line S2 in the first direction X, is 150 μm to 180 μm. The width of each of the gate line G and storage capacitance line C in the second direction Y is 5 μm. The width of the source line S in the first direction X is 3 μm. In the meantime, the gate line G and storage capacitance line C are formed in the same layer and need to be electrically insulated, and therefore a margin of, e.g. 10 μm is secured therebetween. The source line S, source electrode WS and drain electrode WD are formed in the same layer and need to be electrically insulated, and therefore a margin of, e.g. 10 μm is secured therebetween.

FIG. 3 is a plan view which schematically shows a structure example of one pixel PX in the counter-substrate CT shown in FIG. 1. FIG. 3 shows a plan view in the X-Y plane. FIG. 3 only shows structural parts that are necessary for the description, and the gate line G, source line S and switching element SW, which are provided on the array substrate, are indicated by broken lines.

The common electrode CE includes a main common electrode CA on the counter-substrate CT. In the example illustrated, the common electrode CE further includes a sub-common electrode CB on the counter-substrate CT. The sub-common electrode CB, however, may be omitted.

In the X-Y plane, the main common electrodes CA linearly extend in the first direction X on both sides of the second electrode portion D2 and third electrode portion D3 of the drain electrode WD, respectively. In other words, the main common electrodes CA are disposed between the second electrode portion D2 and third electrode portion D3 and above the gate lines G, and extend in the first direction X. The main common electrode CA is formed in a strip shape having a substantially uniform width in the second direction Y.

In the example illustrated, three main common electrodes CA are arranged in parallel with a distance in the second direction Y. Specifically, in each pixel, three main common electrodes CA are arranged with equal pitches in the second direction Y. In the pixel PX, a main common electrode CAU is disposed at an upper side end portion, a main common electrode CAB is disposed at a lower side end portion, and a main common electrode CAC is disposed in the center of the pixel. Strictly speaking, the main common electrode CAU is disposed to extend over a boundary between the pixel PX and a pixel neighboring on the upper side, and the main common electrode CAB is disposed to extend over a boundary between the pixel PX and a pixel neighboring on the lower side. The main common electrode CAU is located above the gate line G1, and the main common electrode CAB is located above the gate line G2. The main common electrode CAC is located between the second electrode portion D2 and third electrode portion D3, and passes above the contact position PP where the drain electrode WD contacts the semiconductor layer SC.

The main common electrode CAU and the main common electrode CAC are located on both sides of the second electrode portion D2. Similarly, the main common electrode CAC and the main common electrode CAB are located on both sides of the third electrode portion D3. In other words, the main common electrode CAC disposed in the center of the pixel is located at a substantially middle point between the second electrode portion D2 and third electrode portion D3. Specifically, in the example illustrated, the main common electrode CAB, third electrode portion D3, main common electrode CAC, second electrode portion D2 and main common electrode CAU are arranged in the named order along the second direction Y in the X-Y plane. In the meantime, the inter-electrode distance in the second direction Y between the second electrode portion D2 and main common electrode CAC is substantially equal to the inter-electrode distance in the second direction Y between the main common electrode CAC and third electrode portion D3. The inter-electrode distance in the second direction Y between the main common electrode CAU and second electrode portion D2 is substantially equal to the inter-electrode distance in the second direction Y between the third electrode portion D3 and main common electrode CAB.

The sub-common electrodes CB linearly extend, in the X-Y plane, in the second direction Y on both sides of the drain electrode WD. In other words, the sub-common electrodes CB are respectively located above the source lines S, and are connected to the main common electrode CA and linearly extend in the second direction Y. The sub-common electrode CB is formed in a strip shape having a substantially uniform width in the first direction X. In addition, the sub-common electrode CB is formed integral or continuous with the main common electrode CA, and is electrically connected to the main common electrode CA. Specifically, in the counter-substrate CT, the common electrode CE is formed in a grid shape.

In the example illustrated, two sub-common electrodes CB are arranged in parallel with a distance in the first direction X, and are disposed at both left and right end portions of the pixel PX. Specifically, in each pixel, two sub-common electrodes CB are arranged. In the pixel PX illustrated, a sub-common electrode CBL is disposed at a left side end portion, and a sub-common electrode CBR is disposed at a right side end portion. Strictly speaking, the sub-common electrode CBL is disposed to extend over a boundary between the pixel PX and a pixel neighboring on the left side, and the sub-common electrode CBR is disposed to extend over a boundary between the pixel PX and a pixel neighboring on the right side. The sub-common electrode CBL is located above the source line S1, and the sub-common electrode CBR is located above the source line S2.

In the counter-substrate CT, the common electrode CE is covered with a second alignment film AL2. The second alignment film AL2 is subjected to alignment treatment (e.g. rubbing treatment or optical alignment treatment) in a second alignment treatment direction PD2 for initially aligning the liquid crystal molecules of the liquid crystal layer LQ. The second alignment treatment direction PD2, in which the second alignment film AL2 initially aligns the liquid crystal molecules, is parallel to the first alignment treatment direction PD1, and is identical or opposite to the first alignment treatment direction PD1. In the example illustrated, the second alignment treatment direction PD2 is substantially parallel to the first direction X, and is parallel and identical to the first alignment treatment direction PD1 in the X-Y plane.

Figure 4:
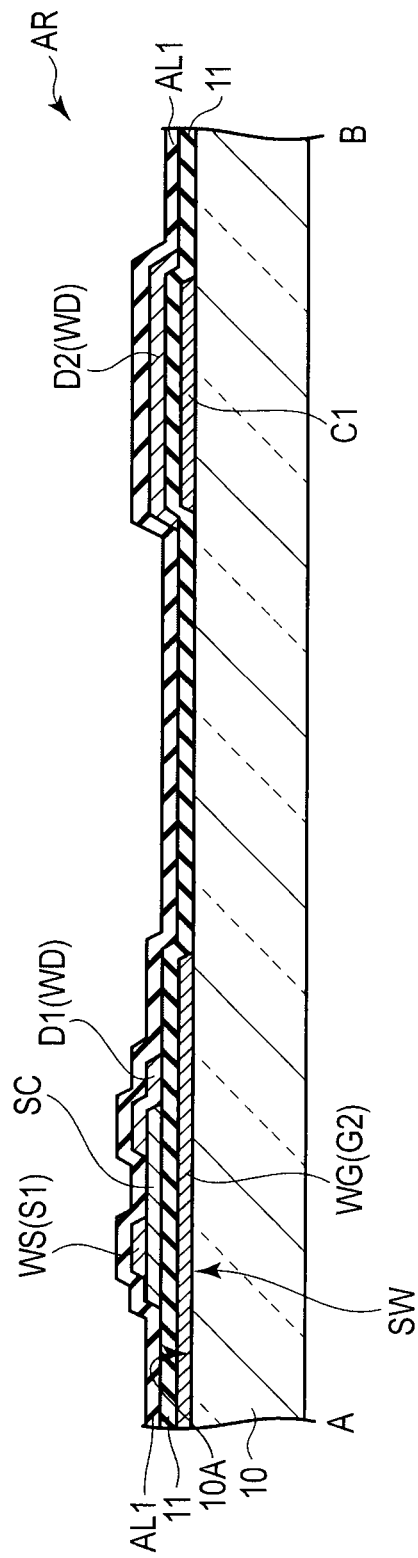
FIG. 4 is a schematic cross-sectional view, taken along the line A-B in FIG. 2, showing a cross-sectional structure of the array substrate.

FIG. 4 is a schematic cross-sectional view, taken along the line A-B in FIG. 2, showing a cross-sectional structure of the array substrate AR.

The array substrate AR is formed by using a first insulative substrate 10 having light transmissivity. The array substrate AR includes, on the first insulative substrate 10, a switching element SW, a storage capacitance line C1, a first insulation film 11 and a first alignment film AL1.

A gate electrode WG of the switching element SW is a part of the gate line G2, and is formed on an inner surface 10A of the first insulative substrate 10. The storage capacitance line C1 is located apart from the gate electrode WG, and is formed on the inner surface 10A of the first insulative substrate 10. The gate electrode WG, gate line G and storage capacitance line C are formed of the same material, and can be collectively formed by using the same material. The gate electrode WG integral with the gate line G2 and storage capacitance line C1 are covered with the first insulation film 11.

A semiconductor layer SC of the switching element SW is formed on the first insulation film 11 and is located immediately above the gate electrode WG. A source electrode WS of the switching element SW is a part of the source line S1, is formed on the first insulation film 11, and is put in contact with the semiconductor layer SC. A drain electrode WD is located apart from the source electrode WS and source line S, and is formed on the first insulation film 11. A first electrode portion D1, which is a part of the drain electrode WD, is put in contact with the semiconductor layer SC. A second electrode portion D2, which is a part of the drain electrode WD, is located immediately above the storage capacitance line C1. Specifically, the second electrode portion D2 is opposed to the storage capacitance line C1 via the first insulation film 11. The source electrode WS and drain electrode WD are formed of the same material (i.e. the above-mentioned wiring material) as the source line, and can be collectively formed by using the same material.

The first alignment film AL1 covers the semiconductor layer SC, the source electrode WS and the drain electrode WD constituting the switching element SW, and is also disposed over the first insulation film 11. The first alignment film AL1 is formed of a material which exhibits horizontal alignment properties.

The switching element SW may be covered with other insulation films such as a passivation film.

Figure 5:
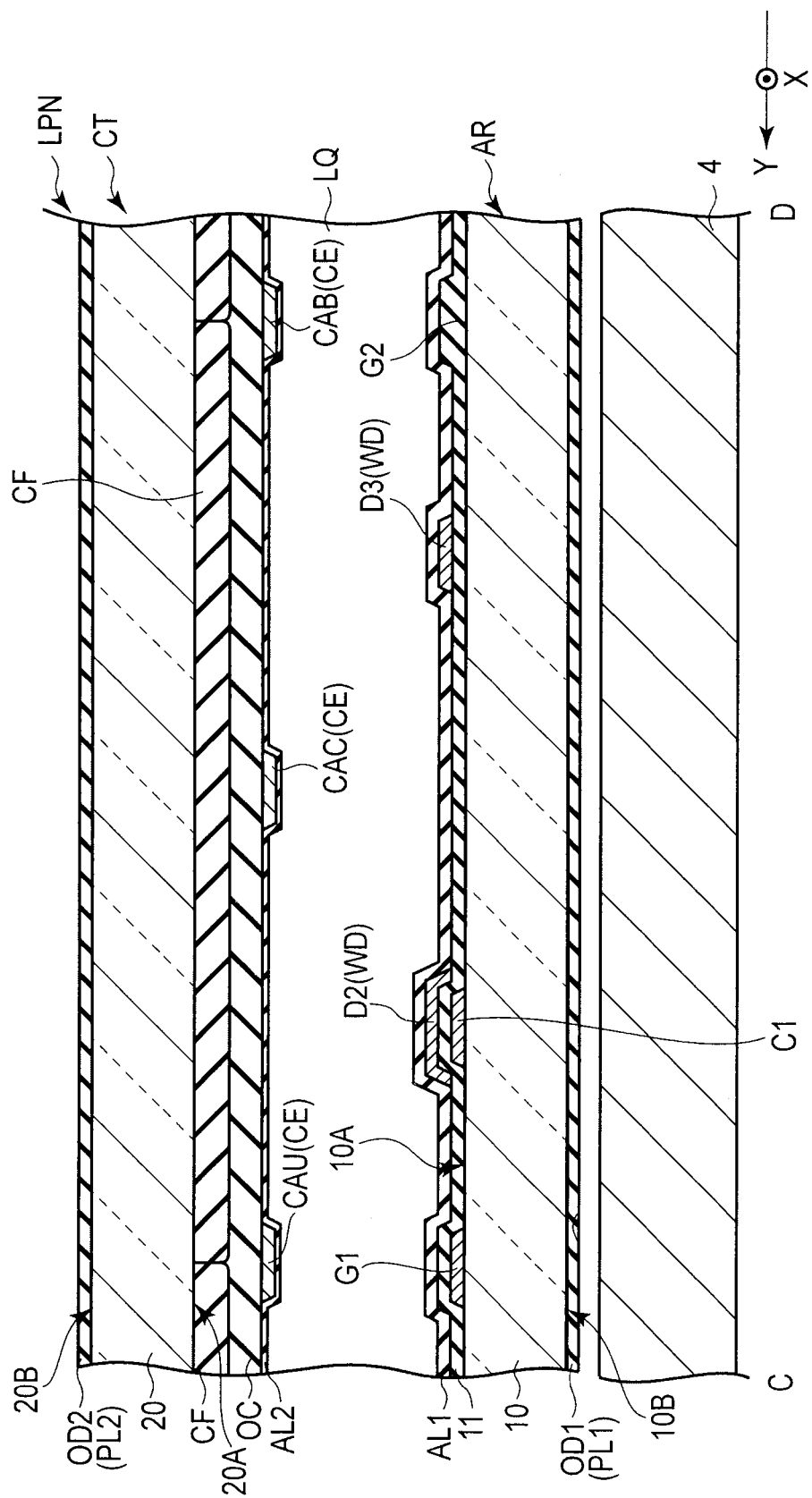
FIG. 5 is a schematic cross-sectional view, taken along the line C-D in FIG. 3, showing a cross-sectional structure of a liquid crystal display panel.

FIG. 5 is a schematic cross-sectional view, taken along the line C-D in FIG. 3, showing a cross-sectional structure of the liquid crystal display panel LPN.

A backlight 4 is disposed on the back side of the array substrate AR which constitutes the liquid crystal display panel LPN. Various modes are applicable to the backlight 4. As the backlight 4, use may be made of either a backlight which utilizes a light-emitting diode (LED) as a light source, or a backlight which utilizes a cold cathode fluorescent lamp (CCFL) as a light source. A description of the detailed structure of the backlight 4 is omitted.

In the array substrate AR, the storage capacitance line C1, gate line G1 and gate line G2 are formed on the inner surface 10A of the first insulative substrate 10, that is, on the side thereof facing the counter-substrate CT, and are covered with the first insulation film 11. The second electrode portion D2 and third electrode portion D3 of the drain electrode WD are formed on the first insulation film 11, and is covered with the first alignment film AL1. The second electrode portion D2 and third electrode portion D3 are located between the gate line G1 and gate line G2. The first alignment film AL1 is disposed on the surface of the array substrate AR, which is opposed to the counter-substrate CT, and the first alignment film AL1 extends over substantially the entirety of the active area ACT.

The counter-substrate CT is formed by using a second insulative substrate 20 having light transmissivity. The counter-substrate CT includes, on the inside of the second insulative substrate 20, that is, on the side thereof facing the array substrate AR, a color filter CF, an overcoat layer OC, a common electrode CE, and a second alignment film AL2. A black matrix which partitions the pixels PX may be disposed on an inner surface 20A, which is opposed to the array substrate AR, of the second insulative substrate 20.

The color filter CF is disposed in association with each pixel PX. Specifically, the color filter CF is disposed on the inner surface 20A of the second insulative substrate 20. Color filters CF, which are disposed in the pixels PX neighboring in the second direction Y, have mutually different colors. For example, the color filters CF are formed of resin materials which are colored in three primary colors of red, blue and green. The red color filter formed of the red resin material is disposed to correspond to the red pixel. The blue color filter formed of the blue resin material is disposed to correspond to the blue pixel. The green color filter formed of the green resin material is disposed to correspond to the green pixel.

The overcoat layer OC covers the color filters CF. The overcoat layer OC reduces the effect of asperities on the surfaces of the color filters CF.

The main common electrode CAU, main common electrode CAC and main common electrode CAB of the common electrode CE, and the sub-common electrode CB (not shown) are formed on the side of the overcoat layer OC, which is opposed to the array substrate AR. The main common electrode CAU is located immediately above the gate line G1. The main common electrode CAB is located immediately above the gate line G2. The main common electrode CAC is located between the main common electrode CAU and main common electrode CAB or between the second electrode portion D2 and third electrode portion D3.

The regions between the drain electrode WD functioning as a pixel electrode and the common electrode CE, namely, a region between the main common electrode CAU and second electrode portion D2, a region between the main common electrode CAC and second electrode portion D2, a region between the main common electrode CAC and third electrode portion D3 and a region between the main common electrode CAB and third electrode portion D3, correspond to transmissive regions through which light can pass.

The second alignment film AL2 is formed on the surface of the counter-substrate CT, which is opposed to the array substrate AR, and the second alignment film AL2 extends over substantially the entirety of the active area ACT. The second alignment film AL2 covers the common electrode CE and overcoat layer OC. The second alignment film AL2 is formed of a material which exhibits horizontal alignment properties.

The above-described array substrate AR and counter-substrate CT are disposed such that their first alignment film AL1 and second alignment film AL2 are opposed to each other. In this case, columnar spacers, which are formed of, e.g. a resin material so as to be integral to one of the array substrate AR and counter-substrate CT, are disposed between the first alignment film AL1 of the array substrate AR and the second alignment film AL2 of the counter-substrate CT. Thereby, a predetermined cell gap, for example, a cell gap of 2 to 7 μm, is created. The array substrate AR and counter-substrate CT are attached by a sealant on the outside of the active area ACT in the state in which the predetermined cell gap is created therebetween.

The liquid crystal layer LQ is held in the cell gap which is created between the array substrate AR and the counter-substrate CT, and is disposed between the first alignment film AL1 and the second alignment film AL2. The liquid crystal layer LQ is composed of, for example, a liquid crystal material having a positive (positive-type) dielectric constant anisotropy.

The distance in the second direction Y between the second electrode portion D2 and the main common electrode CAU as well as the main common electrode CAC and the distance in the second direction Y between the third electrode portion D3 and the main common electrode CAC as well as the main common electrode CAB are greater than the thickness of the liquid crystal layer LQ, and is double or more the thickness of the liquid crystal layer LQ.

A first optical element OD1 is attached by, e.g. an adhesive, to an outer surface of the array substrate AR, that is, an outer surface 10B of the first insulative substrate 10. This first optical element OD1 is located on the side of the liquid crystal display panel LPN, which is opposed to the backlight 4, and controls the polarization state of incident light which enters the liquid crystal display panel LPN from the backlight 4. The first optical element OD1 includes a first polarizer PL1 having a first polarization axis AX1. In the meantime, another optical element, such as a retardation plate, may be disposed between the first polarizer PL1 and the first insulative substrate 10.

A second optical element OD2 is attached by, e.g. an adhesive, to an outer surface of the counter-substrate CT, that is, an outer surface 20B of the second insulative substrate 20. The second optical element OD2 is located on the display surface side of the liquid crystal display panel LPN, and controls the polarization state of emission light emerging from the liquid crystal display panel LPN. The second optical element OD2 includes a second polarizer PL2 having a second polarization axis AX2. In the meantime, another optical element, such as a retardation plate, may be disposed between the second polarizer PL2 and the second insulative substrate 20.

The first polarization axis AX1 of the first polarizer PL1 and the second polarization axis AX2 of the second polarizer PL2 have a substantially orthogonal positional relationship (crossed Nicols). In this case, one of the polarizers is disposed such that the polarization axis thereof is substantially parallel or substantially perpendicular to the direction of extension of the second electrode portion D2 and the third electrode portion D3 or the main common electrode CA. Specifically, when the direction of extension of the second electrode portion D2 and the third electrode portion D3 or the main common electrode CA is the first direction X, the polarization axis of one of the polarizers is substantially parallel to the first direction X, or is substantially parallel to the second direction Y. Alternatively, one of the polarizers is disposed such that the polarization axis thereof is parallel or perpendicular to the direction of initial alignment of liquid crystal molecules, that is, the first alignment treatment direction PD1 or second alignment treatment direction PD2. When the initial alignment direction is substantially parallel to the first direction X, the polarization axis of one polarizer is substantially parallel to the first direction X, or is substantially parallel to the second direction Y.

In an example shown in part (a) of FIG. 3, the second polarizer PL2 is disposed such that the second polarization axis AX2 thereof is perpendicular to the first direction X, and the first polarizer PL1 is disposed such that the first polarization axis AX1 thereof is parallel to the first direction X. In addition, in an example shown in part (b) of FIG. 3, the first polarizer PL1 is disposed such that the first polarization axis AX1 thereof is perpendicular to the first direction X, and the second polarizer PL2 is disposed such that the second polarization axis AX2 thereof is parallel to the first direction X.

Next, the operation of the liquid crystal display panel LPN having the above-described configuration is described with reference to FIG. 2 to FIG. 5.

In a state in which no voltage is applied to the liquid crystal layer LQ, that is, in a state (OFF time) in which no electric field is produced between the drain electrode WD and common electrode CE, the liquid crystal molecule LM of the liquid crystal layer LQ is aligned such that the major axis thereof is positioned in the first alignment treatment direction PD1 of the first alignment film AL1 and in the second alignment treatment direction PD2 of the second alignment film AL2. This OFF time corresponds to the initial alignment state, and the alignment direction of the liquid crystal molecule LM at the OFF time corresponds to the initial alignment direction.

Strictly speaking, the liquid crystal molecule LM is not always aligned in parallel to the X-Y plane, and, in many cases, the liquid crystal molecule LM is pre-tilted. Thus, the initial alignment direction of the liquid crystal molecule LM corresponds to a direction in which the major axis of the liquid crystal molecule LM at the OFF time is orthogonally projected onto the X-Y plane. In the description below, for the purpose of simplicity, it is assumed that the liquid crystal molecule LM is aligned in parallel to the X-Y plane, and the liquid crystal molecule LM rotates in a plane parallel to the X-Y plane. In this example, each of the first alignment treatment direction PD1 and the second alignment treatment direction PD2 is substantially parallel to the first direction X. At the OFF time, the liquid crystal molecule LM is initially aligned such that the major axis thereof is substantially parallel to the first direction X, as indicated by a broken line in FIG. 3.

When the first alignment treatment direction PD1 and the second alignment treatment direction PD2 are parallel and identical to each other, as in the example illustrated, the liquid crystal molecules LM are substantially horizontally aligned (the pre-tilt angle is substantially zero) in the middle part of the liquid crystal layer LQ in the cross section of the liquid crystal layer LQ, and the liquid crystal molecules LM are aligned at such a pre-tilt angle that the liquid crystal molecules LM become symmetric in the vicinity of the first alignment film AL1 and in the vicinity of the second alignment film AL2, with respect to the middle part of the boundary (splay alignment). In the state in which the liquid crystal molecules LM are splay-aligned, optical compensation can be made by the liquid crystal molecules LM in the vicinity of the first alignment film AL1 and the liquid crystal molecules LM in the vicinity of the second alignment film AL2, even in a direction inclined to the normal direction of the substrate. Therefore, when the first alignment treatment direction PD1 and the second alignment treatment direction PD2 are parallel and identical to each other, light leakage is small in the case of black display, a high contrast ratio can be realized, and the display quality can be improved. In the meantime, when the first alignment treatment direction PD1 and the second alignment treatment direction PD2 are parallel and opposite to each other, the liquid crystal molecules LM are aligned with substantially equal pre-tilt angles, in the cross section of the liquid crystal layer LQ, in the vicinity of the first alignment film AL1, in the vicinity of the second alignment film AL2, and in the middle part of the liquid crystal layer LQ (homogeneous alignment).

Part of light from the backlight 4 passes through the first polarizer PL1, becomes linearly polarized light which is perpendicular to the first polarization axis AX1, and enters the liquid crystal display panel LPN. The polarization state of such linearly polarized light hardly varies when the light passes through the liquid crystal layer LQ at the OFF time. Thus, the linearly polarized light, which has passed through the liquid crystal display panel LPN, is absorbed by the second polarizer PL2 that is in the positional relationship of crossed Nicols in relation to the first polarizer PL1 (black display).

On the other hand, in a state in which a voltage is applied to the liquid crystal layer LQ, that is, in a state (ON time) in which an electric field is produced between the drain electrode WD and common electrode CE, a lateral electric field (or an oblique electric field), which is substantially parallel to the substrate, is produced between the drain electrode WD and the common electrode CE. The liquid crystal molecules LM are affected by the electric field, and the major axes thereof rotate within a plane which is substantially parallel to the X-Y plane, as indicated by solid lines in the Figure.

In the example shown in FIG. 3, in the pixel PX, the liquid crystal molecule LM in a region between the second electrode portion D2 and main common electrode CAC rotates counterclockwise relative to the first direction X, and is aligned in a lower left direction in the Figure. The liquid crystal molecule LM in a region between the third electrode portion D3 and main common electrode CAC rotates clockwise relative to the first direction X, and is aligned in an upper left direction in the Figure.

As has been described above, in the state in which the electric field is produced between the drain electrode WD and the common electrode CE in each pixel PX, the liquid crystal molecules LM are aligned in a plurality of directions, with boundaries at positions overlapping the drain electrode WD or at positions overlapping the common electrode CE, and domains are formed in the respective alignment directions. Specifically, a plurality of domains is formed in one pixel PX.

At such ON time, part of backlight, which is incident on the liquid crystal display panel LPN from the backlight 4, passes through the first polarizer PL1, becomes linearly polarized light which is perpendicular to the first polarization axis AX1, and enters the liquid crystal display panel LPN. The polarization state of such linearly polarized light varies depending on the alignment state of the liquid crystal molecules LM when the light passes through the liquid crystal layer LQ. For example, when linearly polarized light, which is parallel to the first direction X, has entered the liquid crystal display panel LPN, the light is affected, while passing through the liquid crystal layer LQ, by a retardation of $\lambda/2$ by the liquid crystal molecules LM which are aligned in a 45°-225° azimuth direction or a 135°-315° azimuth direction relative to the first direction X ($\lambda$ is a wavelength of light passing through the liquid crystal layer LQ). Thereby, the polarization state of the light, which has passed through the liquid crystal layer LQ, becomes linear polarization parallel to the second direction Y. Thus, at the ON time, at least part of the light emerging from the liquid crystal layer LQ passes through the second polarizer PL2 (white display). However, at a position overlapping the drain electrode or common electrode, since the liquid crystal molecules maintain the initial alignment state, black display is effected as in the case of the OFF time.

According to the present embodiment, the laterally elongated pixel structure is adopted, wherein the length in the first direction X, which is the direction of extension of the gate line and storage capacitance line, is greater than the length in the second direction Y, which is the direction of extension of the source line. Thereby, compared to a vertically elongated pixel structure wherein the length in the second direction Y is greater than the length in the first direction X, the total number of signal lines, such as gate lines, storage capacitance lines and source lines, can be reduced, despite the total number of pixels in the active area being the same. Thus, the number of terminals of signal lines can be reduced, the scale of drivers for supplying signals to these signal lines can be reduced, and the number of driving IC chips, which are to be mounted in the liquid crystal display panel LPN, can be reduced. Therefore, cost reduction can be realized.

In addition, according to the present embodiment, the drain electrode WD of the switching element SW functions as the pixel electrode PE. In the drain electrode WD, the distance from the contact position PP where the drain electrode WD contacts the semiconductor layer SC to each of the second electrode portion D2 and the third electrode portion D3 can be equal, and the deterioration of display quality resulting from a resistance difference between the second electrode portion D2 and the third electrode portion D3 can be inhibited. The contact position PP is at an equal distance from both the gate line G1 and gate line G2. Therefore, even if the first pitch between the gate lines G is changed for each specification, the distance from the contact position PP to each of the second electrode portion D2 and the third electrode portion D3 does not become uneven, and products of various pixel pitches can be provided.

A capacitance is formed between the storage capacitance line C1 and drain electrode WD which are opposed to each other via the first insulation film 11. Specifically, the gap between the storage capacitance line C1 and drain electrode WD corresponds to the thickness of the first insulation film 11. Therefore, in the configuration according to the present embodiment, a higher capacitance can be efficiently formed with a small area, compared to a capacitance formed when a plurality of insulation films intervene between the storage capacitance line C1 and pixel electrode PE.

In the configuration in which the drain electrode WD is formed in a loop shape, redundancy can be improved. Specifically, even if a part of the drain electrode WD is broken, other paths can be used to supply a pixel potential to both the second electrode portion D2 and the third electrode portion D3 which substantially function as pixel electrodes. Thus, the deterioration of display quality, e.g. a display defect resulting from the breakage of the pixel PX can be inhibited even if the width of the electrode is considerably reduced in response to requests for higher definition.

In the drain electrode WD, the first electrode portion D1 including a region which contacts the semiconductor layer SC linearly extends along the second direction Y and is mostly located immediately above the gate electrode WG, and only slightly projects from the gate electrode WG. Accordingly, a sufficiently large area of the transmissive region can be secured.

Furthermore, according to the present embodiment, the drain electrode WD functioning as the pixel electrode PE is formed of the wiring material which does not use indium (In). Therefore, the amount of indium used can be smaller than when both the pixel electrode PE and common electrode CE are formed of ITO or IZO. When formed of an electrically conductive material which does not use indium (In), the common electrode CE as well as the drain electrode WD can be free of indium.

Almost no lateral electric field is formed (or no electric field sufficient to drive the liquid crystal molecules LM is formed) on the drain electrode WD or the common electrode CE not only at the OFF time but also at the ON time, so that the liquid crystal molecules LM hardly move from the initial alignment direction as at the OFF time. Therefore, even if the drain electrode WD and the common electrode CE are formed of a light-transmissive electrically conductive material such as ITO, the backlight hardly passes through these regions and hardly contributes to display at the ON time. Therefore, even if the drain electrode WD and the common electrode CE are formed of the above-mentioned opaque wiring material as in the present embodiment, the reduction of transmittance at the ON time or the reduction of the area of the transmissive region substantially contributing to display can be inhibited, compared to the case in which the drain electrode WD and the common electrode CE are formed of a transparent electrically conductive material.

In the present embodiment in which the drain electrode WD is formed of the above-mentioned opaque wiring material, the linearly polarized light which has entered the liquid crystal display panel LPN is substantially parallel or substantially perpendicular to the direction of extension of the edge of the drain electrode WD. The direction of extension of the gate line G, storage capacitance line C and source line S which are formed of the above-mentioned opaque wiring material is substantially parallel or substantially perpendicular to the linearly polarized light which has entered the liquid crystal display panel LPN. The common electrode CE may be also formed of the above-mentioned opaque electrically conductive material, in which case the direction of extension of the common electrode CE is substantially parallel or substantially perpendicular to the linearly polarized light which has entered the liquid crystal display panel LPN. Thus, the plane of polarization of the linearly polarized light reflected by the edges of the drain electrode WD, common electrode CE, gate line G, storage capacitance line C and source line S is not easily disturbed, and the linearly polarized light can maintain the plane of polarization obtained when the light has passed through the first polarizer PL1 which is a polarizer. Therefore, at the OFF time, the linearly polarized light which has passed through the liquid crystal display panel LPN is sufficiently absorbed by the second polarizer PL2 which is an analyzer. This can inhibit light leakage. Specifically, transmittance can be sufficiently reduced in the case of black display, and the deterioration of the contrast ratio can be inhibited. Moreover, the width of the black matrix does not need to be increased for measures against light leakage on the periphery of the drain electrode WD and common electrode CE, and it is possible to inhibit the reduction of the area of the transmissive region and the deterioration of transmittance at the ON time. Consequently, the deterioration of display quality can be inhibited.

According to the present embodiment, the drain electrode WD functioning as the pixel electrode PE can be formed of the same material as the source line S and source electrode WS which are formed in the same layer. Therefore, the drain electrode WD can be simultaneously formed in the process of forming the source line S and others. Specifically, the process of forming the pixel electrode PE separately from the drain electrode WD of the switching element SW can be omitted. Thus, manufacturing costs can be reduced.

According to the present embodiment, the drain electrode WD directly contacts the semiconductor layer SC without passing through a contact hole of the insulation film, and functions as the pixel electrode PE. It is therefore possible to inhibit the disturbance of the alignment of the liquid crystal molecules LM resulting from the asperities of the contact hole. This can inhibit light leakage at the OFF time, and improve the contrast ratio.

According to the present embodiment, a high transmittance can be obtained in the inter-electrode gap between the drain electrode WD and the common electrode CE. In addition, a transmittance per pixel can be sufficiently increased by increasing the inter-electrode distance between the drain electrode WD and the common electrode CE. Besides, as regards product specifications of different pixel pitches, for example, it is possible to make use of a peak condition of a transmittance distribution by varying the inter-electrode distance between the drain electrode WD and the common electrode CE. Specifically, in the display mode of the present embodiment, products with various pixel pitches can be provided by setting the inter-electrode distance, without necessarily requiring fine electrode processing, as regards the product specifications from low-resolution product specifications with a relatively large pixel pitch to high-resolution product specifications with a relatively small pixel pitch.

According to the present embodiment, in the region overlapping the common electrode CE, the transmittance is sufficiently lowered. The reason for this is that the electric field does not leak to the outside of the pixel from the positions of the common electrodes CE which are located immediately above the gate lines G and source lines S, and an undesired lateral electric field does not occur between pixels which neighbor each other, and therefore the liquid crystal molecules LM in the region overlapping the common electrode CE keep the initial alignment state, like the case of the OFF time (or black display time). Accordingly, even when the colors of the color filters CF are different between pixels which neighbor each other with the gate line G or source line S interposed, the occurrence of color mixture can be suppressed, and the decrease in color reproducibility or the decrease in contrast ratio can be suppressed. In addition, when misalignment has occurred between the array substrate AR and the counter-substrate CT, a difference in inter-electrode distance between the drain electrode WD and the common electrode CE on both sides of the drain electrode WD occurs commonly in all pixels PX. Thus, the electric field distribution does not differ between the pixels PX, and the influence on the display of images can be reduced.

When one pixel PX is viewed in the X-Y plane, the drain electrode WD on the array substrate AR, is disposed within the inside of the common electrode CE disposed on the counter-substrate CT. In other words, in one pixel PX, the drain electrode WD is surrounded by the common electrode CE. By this arrangement, electric force lines have their starting point and end point within one pixel, and the electric force lines in this pixel do not leak to the neighboring pixel. Thus, for example, electric fields, which are applied to the liquid crystal layer LQ, do not affect each other between pixels PX which neighbor in the first direction X. Therefore, the liquid crystal molecules LM in the pixel do not move due to the effect of the electric field from the neighboring pixel, and the deterioration in display quality can be suppressed.

According to the present embodiment, a plurality of domains can be formed in one pixel. Therefore, the viewing field angle can be optically compensated in a plurality of directions, and a wider viewing field angle can be obtained. In the example shown in FIG. 3, at least two domains are formed in one pixel, and the areas of the two domains are substantially equal to each other. This permits further compensation of the viewing field angle.

The above-described example is directed to the case where the initial alignment direction of liquid crystal molecules LM is parallel to the first direction X. However, the initial alignment direction of liquid crystal molecules LM may be an oblique direction which obliquely crosses the first direction X and second direction Y.

The above-described example relates to the case in which the liquid crystal layer LQ is composed of a liquid crystal material having a positive (positive-type) dielectric constant anisotropy. Alternatively, the liquid crystal layer LQ may be composed of a liquid crystal material having a negative (negative-type) dielectric constant anisotropy.

Since little backlight passes on the drain electrode WD or the common electrode CE at the ON time, the substantial area of the transmissive region is not reduced even in a configuration in which a part of the drain electrode WD overlaps the storage capacitance line C to form a capacitance. Specifically, according to the present embodiment in which a capacitance is formed by the drain electrode WD and the storage capacitance line C, the capacitance necessary for display in the pixel PX can be secured without the reduction in the area of the transmissive region.

Since some of the main common electrodes CA are located above the gate lines G which does not contribute to display, the substantial area of the transmissive region is not reduced.

In the present embodiment, the structure of the pixel PX is not limited to the above-described example.

FIG. 6 is a plan view which schematically shows another structure example of the pixel at a time when the array substrate AR shown in FIG. 1 is viewed from the counter-substrate side.

The structure example illustrated in FIG. 6 differs from the structure example shown in FIG. 2 in that the drain electrode WD includes a connection electrode portion DE which is connected to the second electrode portion D2 and the third electrode portion D3 and which extends along the second direction Y.

Specifically, the drain electrode WD includes the second electrode portion D2 and the third electrode portion D3 which extend along the first direction X, the first electrode portion D1 which is connected to one end of each of the second electrode portion D2 and the third electrode portion D3 and which contacts the semiconductor layer SC and which extends along the second direction Y, the fourth electrode portion D4 which is connected to the other end of each of the second electrode portion D2 and the third electrode portion D3 and which extends along the second direction Y, and the connection electrode portion DE which extends along the second direction Y. The connection electrode portion DE connects the substantially middle position of the second electrode portion D2 and the substantially middle position of the third electrode portion D3. Specifically, the connection electrode portion DE is located at a substantially middle point between the first electrode portion D1 and the fourth electrode portion D4, and the distance in the first direction X between the connection electrode portion DE and the first electrode portion D1 is substantially equal to the distance in the first direction X between the connection electrode portion DE and the fourth electrode portion D4. The drain electrode WD having such a configuration has a shape of numeral "8". Specifically, the drain electrode WD is formed in a loop shape. However, the fourth electrode portion D4 may be omitted.

In the example illustrated, the storage capacitance line C1 not only extends immediately below the second electrode portion D2 but also extends immediately below the connection electrode portion DE. Further, the storage capacitance line C1 may extend immediately below the third electrode portion D3, or may extend immediately below the fourth electrode portion D4 and may be formed in a loop shape.

The counter-substrate CT shown in FIG. 3 can be combined with the array substrate AR in such a structure example. In this case, the main common electrode CAC is located between the second electrode portion D2 and the third electrode portion D3, and is substantially perpendicular to the first electrode portion D1, the fourth electrode portion D4 and the connection electrode portion DE. The distance in the second direction Y between the main common electrode CAC and the second electrode portion D2 is substantially equal to the distance in the second direction Y between the main common electrode CAC and the third electrode portion D3.

Also in such a structure example, the same advantageous effects as in the above-described structure example can be obtained. According to this structure example, more domains can be formed in one pixel than in the previously described structure example. That is, although not described in detail, in the pixel PX, the liquid crystal molecule LM in a left-side region between the second electrode portion D2 and main common electrode CAC rotates counterclockwise relative to the first direction X, and is aligned in a lower left direction in the Figure, and the liquid crystal molecule LM in a right-side region rotates clockwise relative to the first direction X, and is aligned in a lower right direction in the Figure. Moreover, the liquid crystal molecule LM in a left-side region between the third electrode portion D3 and main common electrode CAC rotates clockwise relative to the first direction X, and is aligned in an upper left direction in the Figure, and the liquid crystal molecule LM in a right-side region rotates counterclockwise relative to the first direction X, and is aligned in an upper right direction in the Figure. The areas of these transmissive regions are substantially equal to each other. Therefore, the viewing field angle can be optically compensated in a plurality of directions, and a wider viewing field angle can be obtained.

According to this structure example, a capacitance can be formed between the storage capacitance line C1, and the second electrode portion D2 and connection electrode portion DE of the drain electrode WD. Moreover, a capacitance may also be formed between the storage capacitance line C1, and the third electrode portion D3 and fourth electrode portion D4. Thus, a higher capacitance can be efficiently formed without the reduction in the area of the transmissive region in the pixel PX. In a configuration in which the storage capacitance line C1 is formed in a loop shape, redundancy for the breakage of the storage capacitance line C1 can be improved.

Figure 7:
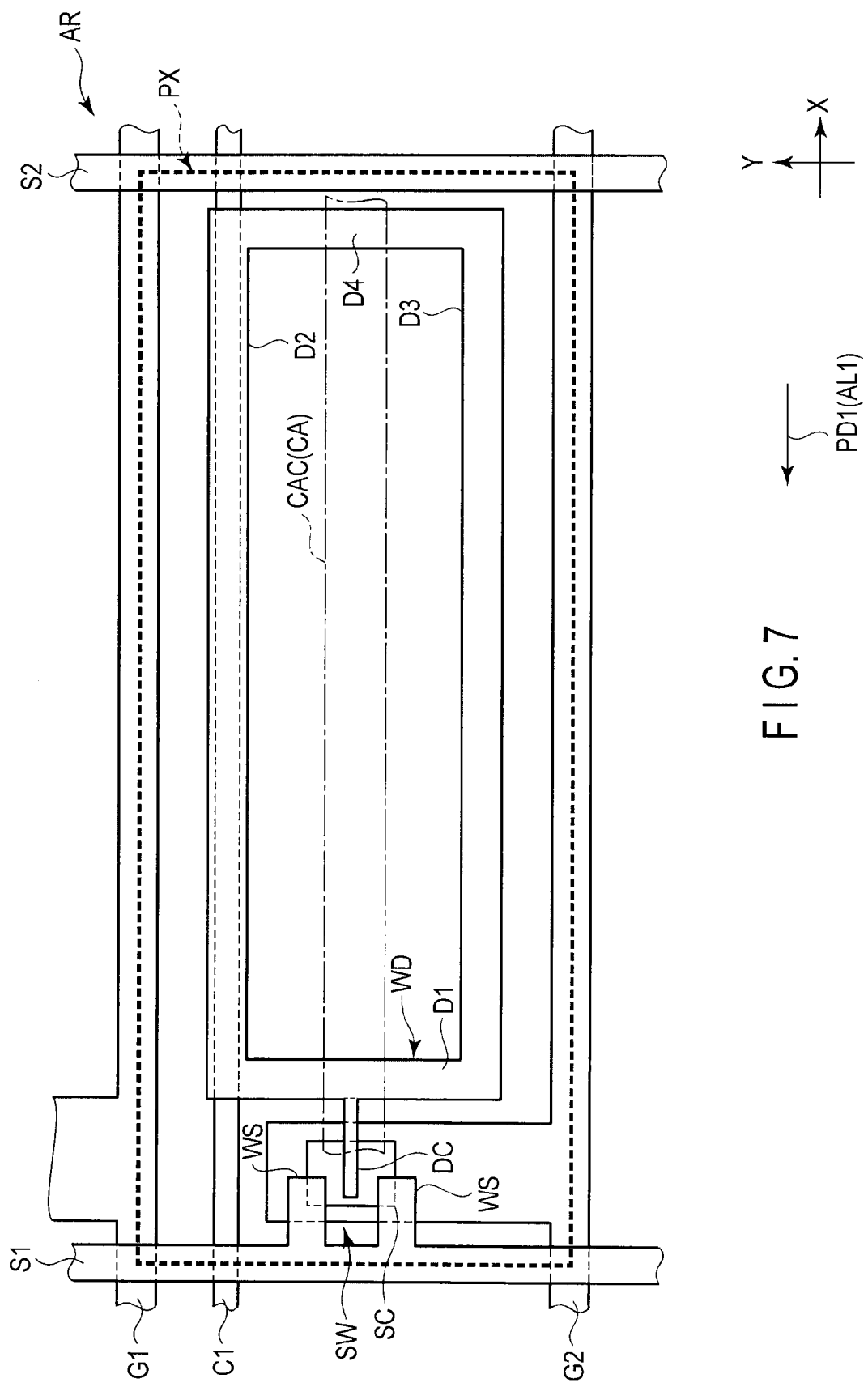
FIG. 7 is a plan view which schematically shows another structure example of the pixel at a time when the array substrate shown in FIG. 1 is viewed from the counter-substrate side.

FIG. 7 is a plan view which schematically shows another structure example of the pixel PX at a time when the array substrate AR shown in FIG. 1 is viewed from the counter-substrate side.

The structure example illustrated in FIG. 7 differs from the structure example shown in FIG. 2 in the structure of the switching element SW. Specifically, the source electrode WS integral with the source line S1 extends along the first direction X, and contacts the semiconductor layer SC at two points. The first electrode portion D1 of the drain electrode WD which also functions as a pixel electrode includes a contact portion DC extending along the first direction X. The contact portion DC contacts the semiconductor layer SC between the source electrodes WS.

Also in the structure example to which the switching element SW having such a structure is applied, the same advantageous effects as in the above-described structure example can be obtained. The first electrode portion D1 is formed at a position which does not overlap the gate electrode WG and the gate line G. Therefore, the storage capacitance line C1 may extend immediately below the first electrode portion D1, or may be formed in a loop shape as is the shown drain electrode WD. It goes without saying that the structure of the switching element SW described here can be applied even to the case in which the drain electrode WD having a shape of numeral "8" shown in FIG. 6 is applied.

All the structure examples described above correspond to the example in which the drain electrode WD also functions as a pixel electrode. The structure examples described below, however, correspond to the example in which the pixel electrode PE is provided separately from the drain electrode WD.

Figure 8:
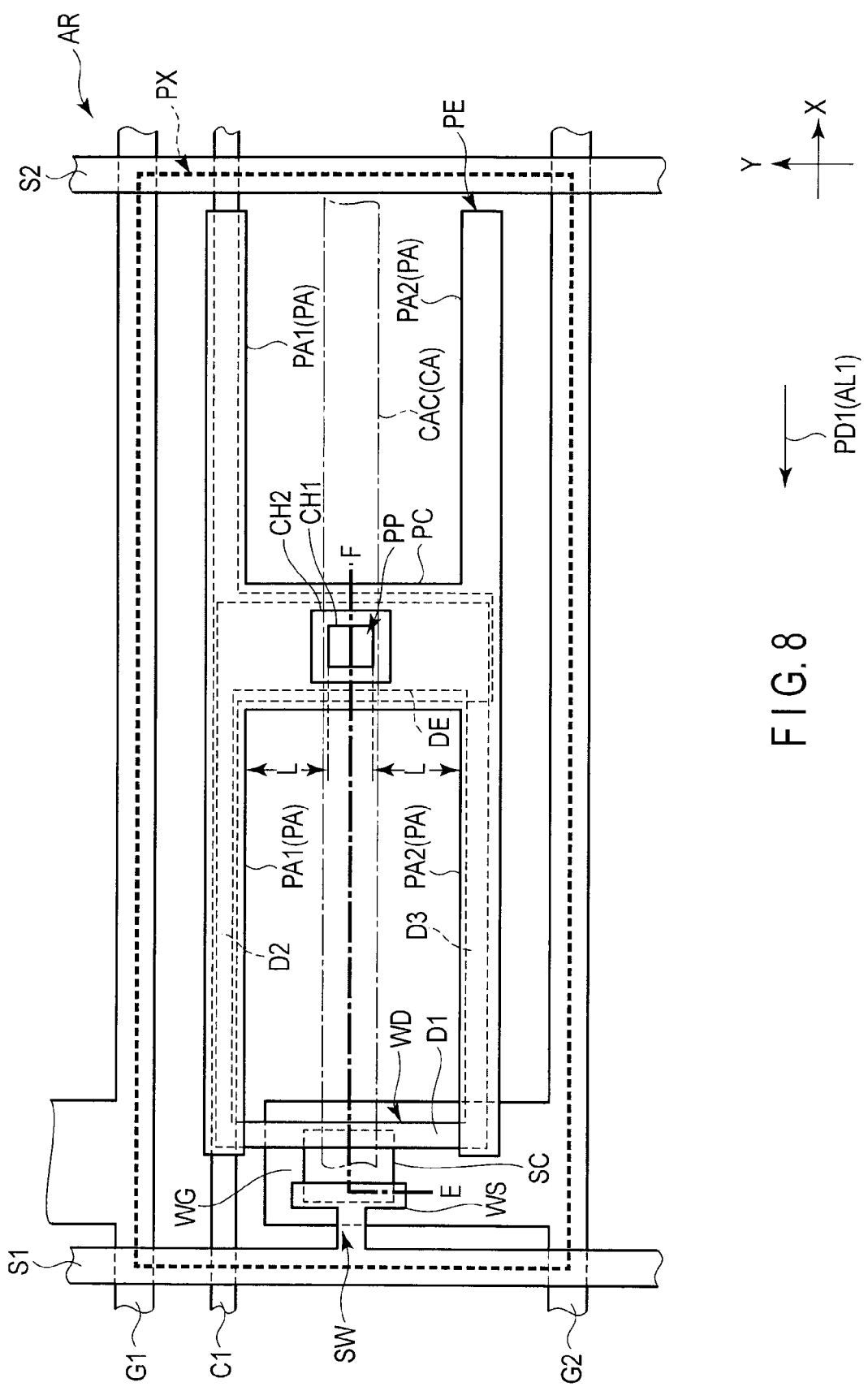
FIG. 8 is a plan view which schematically shows another structure example of the pixel at a time when the array substrate shown in FIG. 1 is viewed from the counter-substrate side.

FIG. 8 is a plan view which schematically shows another structure example of the pixel PX at a time when the array substrate AR shown in FIG. 1 is viewed from the counter-substrate side.

The structure example illustrated in FIG. 8 differs from the structure example shown in FIG. 2 in that the drain electrode WD has a different shape and in that the pixel electrode PE is provided separately from the drain electrode WD.

Specifically, the drain electrode WD includes a second electrode portion D2 and a third electrode portion D3 which extend along the first direction X, a first electrode portion D1 which is connected to one end of each of the second electrode portion D2 and the third electrode portion D3 and which contacts the semiconductor layer SC and which extends along the second direction Y, and a connection electrode portion DE which is located substantially in the center of the pixel PX and which is connected to the other end of each of the second electrode portion D2 and the third electrode portion D3 and which extends along the second direction Y. In the example illustrated here, the drain electrode WD does not extend from the connection electrode portion DE to the source line S2, but each of the second electrode portion D2 and the third electrode portion D3 may extend from the connection electrode portion DE to the source line S2 side. The drain electrode WD having such a configuration has a rectangular shape. Specifically, the drain electrode WD is formed in a loop shape.

The pixel electrode PE is located between the source line S1 and source line S2 which neighbor each other, and is also located between the gate line G1 and gate line G2. Specifically, the pixel electrode PE is located within an inside surrounded by the source line S1 and source line S2 and by the gate line G1 and gate line G2.

The pixel electrode PE includes a main pixel electrode PA and a contact portion PC.

The contact portion PC contacts the switching element SW at the contact position PP. Specifically, the contact portion PC is located immediately above the connection electrode portion DE of the drain electrode WD, and extends along the second direction Y substantially in the center of the pixel PX. The contact portion PC is electrically connected to the drain electrode WD via a contact hole CH1 and a contact hole CH2 at the contact position PP located immediately above the connection electrode portion DE.

Two or more main pixel electrodes PA are provided for one pixel electrode PE. The main pixel electrodes PA extend along the first direction X from the contact portion PC. The main pixel electrodes PA are formed in a strip shape having a substantially uniform width in the second direction Y. The main pixel electrodes PA are formed integral or continuous with the contact portion PC, and are electrically connected to the contact portion PC.

In the example illustrated, the pixel electrode PE includes two main pixel electrodes PA1 and PA2. The main pixel electrode PA1 is located closer to the gate line G1 than to the contact position PP. The main pixel electrode PA2 is located closer to the gate line G2 than to the contact position PP. The main pixel electrode PA1 and the main pixel electrode PA2 linearly extend along the first direction X from the contact portion PC to the right side end portion (i.e. the source line S2 side) and left side end portion (i.e. the source line S1 side) of the pixel PX, respectively. The length of the main pixel electrode PA1 extending from the contact portion PC to the source line S1 side is substantially equal to the length of the main pixel electrode PA1 extending from the contact portion PC to the source line S2 side. Similarly, the length of the main pixel electrode PA2 extending from the contact portion PC to the source line S1 side is substantially equal to the length of the main pixel electrode PA2 extending from the contact portion PC to the source line S2 side. Specifically, the contact portion PC connects the substantially middle position of the main pixel electrode PA1 and the substantially middle position of the main pixel electrode PA2. The pixel electrode PE having such a configuration is H-shaped.

Here, in the pixel electrode PE, a distance L in the second direction Y from the contact position PP to the main pixel electrode PA1 is equal to a distance L in the second direction Y from the contact position PP to the main pixel electrode PA2. The contact position PP is at an equal distance from both the gate line G1 and gate line G2 along the second direction Y.

A part of the main pixel electrode PA1 extending from the contact portion PC toward the source line S1 is located immediately above the second electrode portion D2 of the drain electrode WD. A part of the main pixel electrode PA2 extending from the contact portion PC toward the source line S1 is located immediately above the third electrode portion D3 of the drain electrode WD.

At least one main pixel electrode PA of the pixel electrode PE is located immediately above the storage capacitance line C1. In the example illustrated, the main pixel electrode PA1 and the contact portion PC are located immediately above the storage capacitance line C1. The storage capacitance line C1 forms a capacitance necessary for image display in the pixel PX mainly between this storage capacitance line C1 and the second electrode portion D2 and connection electrode portion DE of the drain electrode WD and between this storage capacitance line C1 and the main pixel electrode PA1.

The counter-substrate CT shown in FIG. 3 can be combined with the array substrate AR in such a structure example. In this case, the main common electrode CAC is located between the second electrode portion D2 and the third electrode portion D3 or between the main pixel electrode PA1 and the main pixel electrode PA2, passes immediately above the contact position PP, and is substantially perpendicular to the first electrode portion D1, the connection electrode portion DE and the contact portion PC. The distance in the second direction Y between the main common electrode CAC and the main pixel electrode PA1 is substantially equal to the distance in the second direction Y between the main common electrode CAC and the main pixel electrode PA2.

Figure 9:
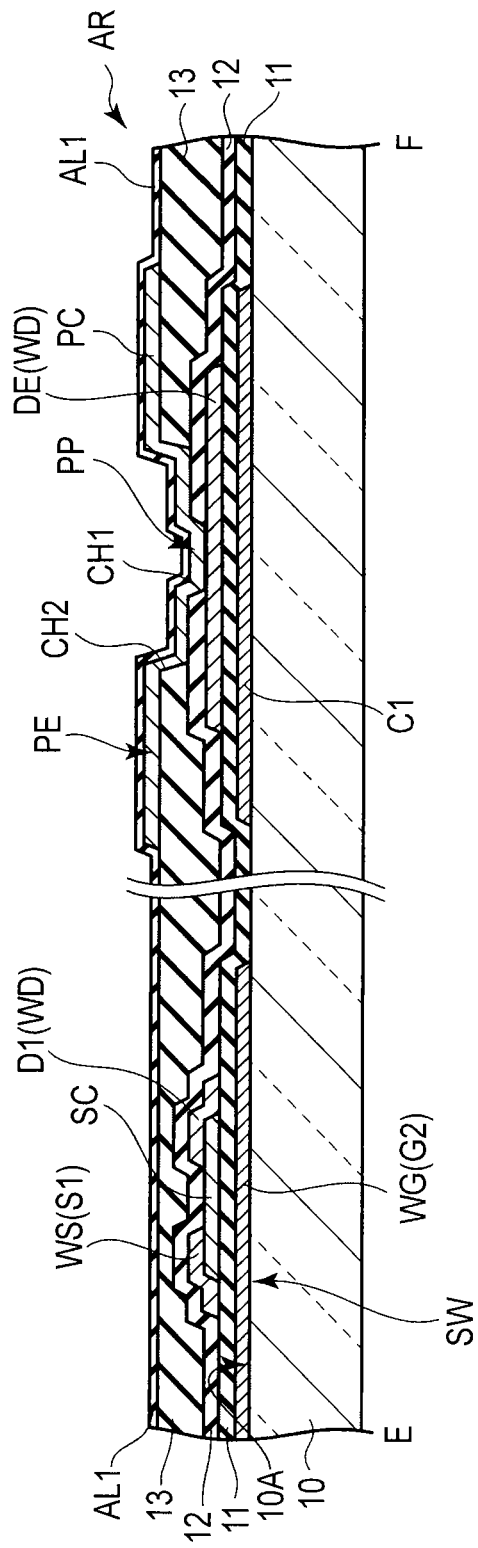
FIG. 9 is a schematic cross-sectional view, taken along the line E-F in FIG. 8, showing a cross-sectional structure of the array substrate.

FIG. 9 is a schematic cross-sectional view, taken along the line E-F in FIG. 8, showing a cross-sectional structure of the array substrate AR.

The array substrate AR includes, on the first insulative substrate 10, a switching element SW, a storage capacitance line C1, a pixel electrode PE, a first insulation film 11, a second insulation film 12, a third insulation film 13 and a first alignment film AL1. The same components as the components shown in FIG. 3 are denoted by the same reference numerals, and an overlapping description is omitted.

The gate electrode WG which is a part of the gate line G2, and the storage capacitance line C1 are formed on the inner surface 10A of the first insulative substrate 10, and are covered with the first insulation film 11. The source electrode WS which is a part of the source line S1, and the first electrode portion D1 of the drain electrode WD contact the semiconductor layer SC formed on the first insulation film 11. The connection electrode portion DE of the drain electrode WD is formed on the first insulation film 11, and is located immediately above the storage capacitance line C1. The semiconductor layer SC, the source electrode WS and the drain electrode WD are covered with the second insulation film 12. The contact hole CH1 pierced up to the connection electrode portion DE is formed in the second insulation film 12.

The third insulation film 13 is formed on the second insulation film 12. The third insulation film 13 is created, for example, by forming an organic material into a film and flattening the surface thereof. The contact hole CH2 is formed in the third insulation film 13. The contact hole CH2 is larger in size than the contact hole CH1, and is pierced up to the connection electrode portion DE in the contact hole CH1, and is also pierced up to the second insulation film 12 around the contact hole CH1.

The pixel electrode PE (i.e. the main pixel electrode PA1 and the main pixel electrode PA2 in addition to the shown contact portion PC) is formed on the third insulation film 13. Specifically, the second insulation film 12 and the third insulation film 13 correspond to interlayer insulation films intervening between the source line, the source electrode as well as the drain electrode, and the pixel electrode PE. The contact portion PC of the pixel electrode PE contacts the connection electrode portion DE via the contact hole CH1 and the contact hole CH2. The contact position PP of the pixel electrode PE corresponds to a position which contacts the connection electrode portion DE via the contact hole CH1 in the contact portion PC. The pixel electrode PE and the third insulation film 13 are covered with the first alignment film AL1

Also in such a structure example, the same advantageous effects as in the above-described structure example can be obtained. According to this structure example, the pixel electrode PE is formed on the third insulation film 13 having its surface flattened. Therefore, the effect of asperities of the surface of the array substrate AR on the alignment state of the liquid crystal molecules LM can be reduced. Moreover, it is also possible to inhibit the increase of the inter-electrode distance between the common electrode CE and the pixel electrode PE on the counter-substrate CT side.

Figure 10:
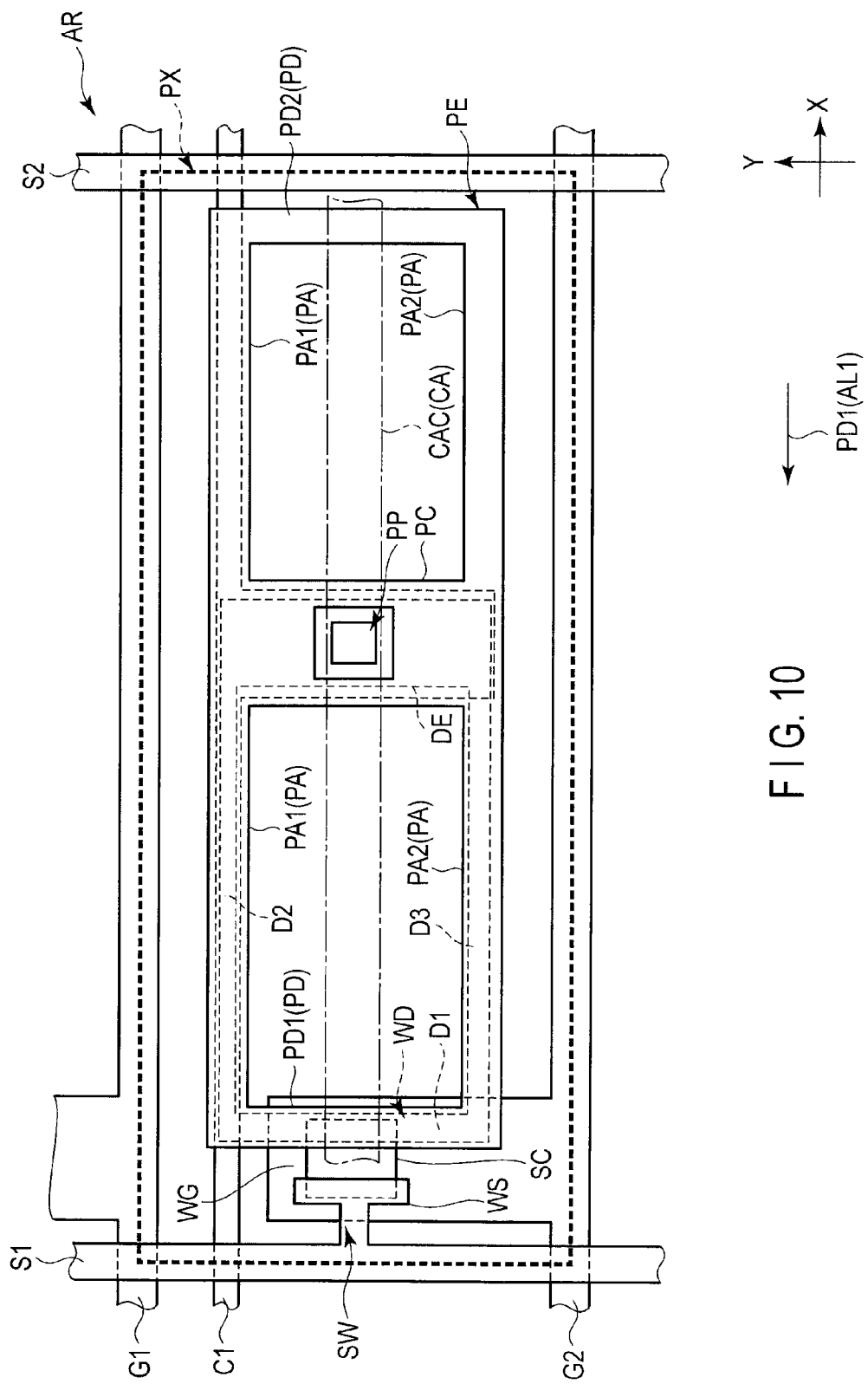
FIG. 10 is a plan view which schematically shows another structure example of the pixel at a time when the array substrate shown in FIG. 1 is viewed from the counter-substrate side.

FIG. 10 is a plan view which schematically shows another structure example of the pixel PX at a time when the array substrate AR shown in FIG. 1 is viewed from the counter-substrate side.

The structure example illustrated in FIG. 10 differs from the structure example shown in FIG. 8 in that the pixel electrode PE is formed in a loop shape. Specifically, the pixel electrode PE includes a plurality of main pixel electrodes PA, a contact portion PC, and a connection portion PD.

The connection portion PD extends in the second direction Y, and connects the main pixel electrodes PA. The connection portion PD is formed in a strip shape having a substantially uniform width in the first direction X. In the example illustrated, on the source line S1 side of the pixel PX, the connection portion PD1 is located immediately above the first electrode portion D1, and connects one end portion of the main pixel electrode PA1 and one end portion of the main pixel electrode PA2. On the side of the source line S2 of the pixel PX, the connection portion PD2 connects the other end portion of the main pixel electrode PA1 and the other end portion of the main pixel electrode PA2. The contact portion PC is located at a substantially middle point between the connection portion PD1 and the connection portion PD2. The pixel electrode PE with this structure is formed in a shape of numeral "8".

Also in such a structure example, the same advantageous effects as in the above-described structure example can be obtained. According to this structure example, since the pixel electrode PE is formed in a loop shape, redundancy for the breakage can be improved.

Figure 11:
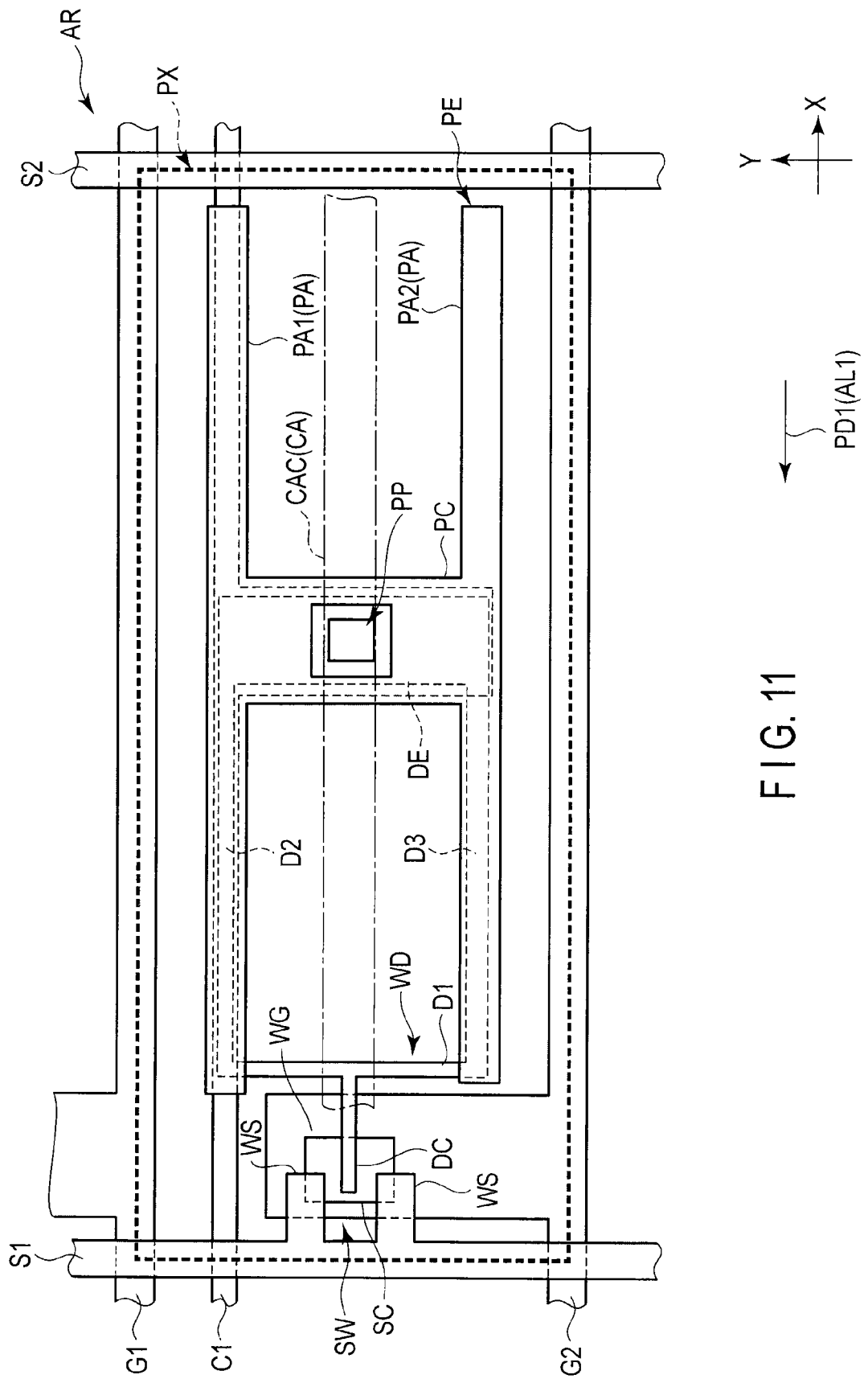
FIG. 11 is a plan view which schematically shows another structure example of the pixel at a time when the array substrate shown in FIG. 1 is viewed from the counter-substrate side.

FIG. 11 is a plan view which schematically shows another structure example of the pixel PX at a time when the array substrate AR shown in FIG. 1 is viewed from the counter-substrate side.

The structure example illustrated in FIG. 11 differs from the structure example shown in FIG. 8 in the structure of the switching element SW. Specifically, the source electrode WS integral with the source line S1 extends along the first direction X, and contacts the semiconductor layer SC at two points. The first electrode portion D1 of the drain electrode WD includes the contact portion DC extending along the first direction X. The contact portion DC contacts the semiconductor layer SC between the source electrodes WS.

Also in the structure example to which the switching element SW having such a structure is applied, the same advantageous effects as in the above-described structure example can be obtained. The pixel electrode PE may be formed in a loop shape as is the structure example shown in FIG. 10.

Figure 12:
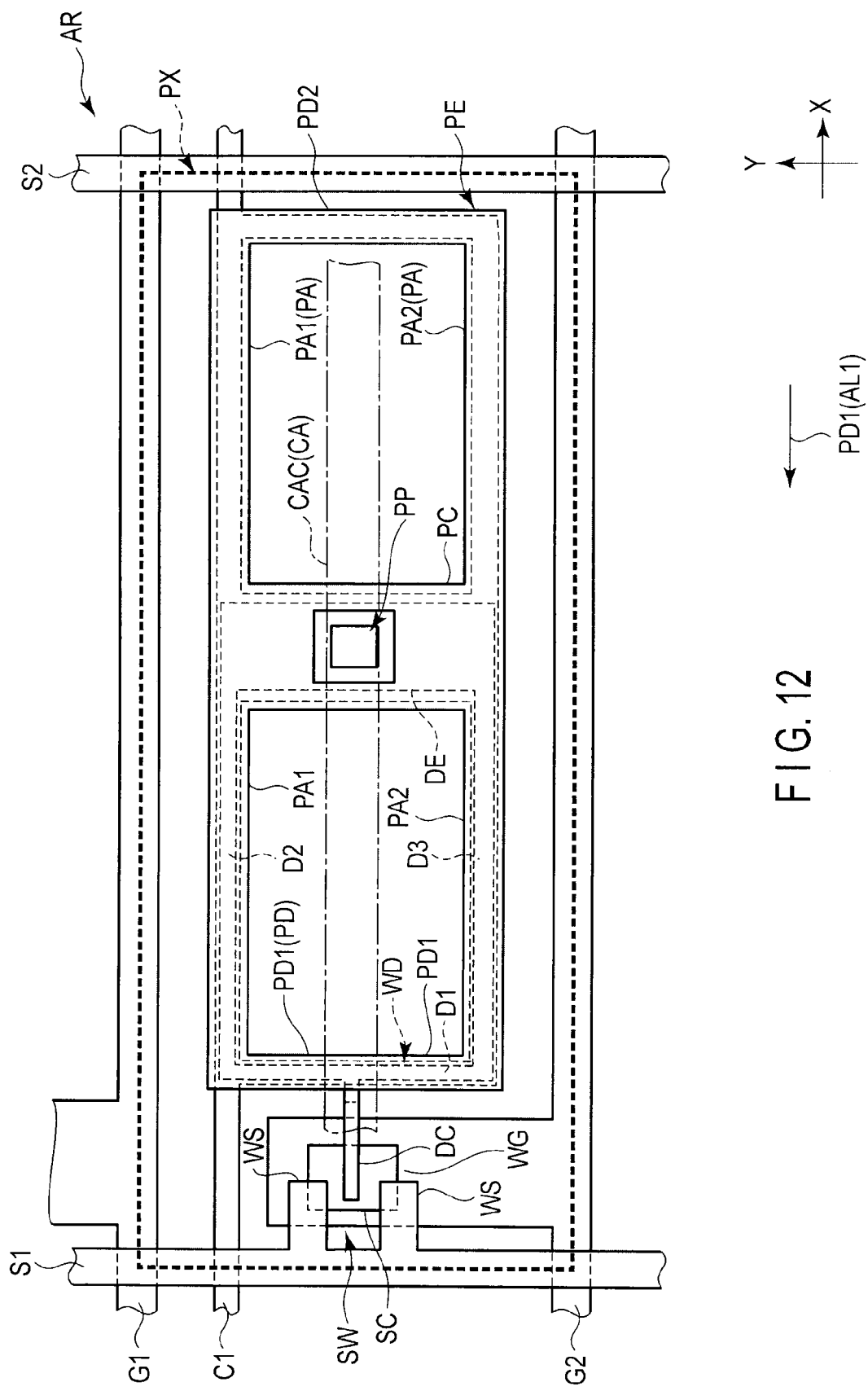
FIG. 12 is a plan view which schematically shows another structure example of the pixel at a time when the array substrate shown in FIG. 1 is viewed from the counter-substrate side.

FIG. 12 is a plan view which schematically shows another structure example of the pixel PX at a time when the array substrate AR shown in FIG. 1 is viewed from the counter-substrate side.

The structure example illustrated in FIG. 12 differs from the structure example shown in FIG. 11 in that the pixel electrode PE is formed in a loop shape and in that the storage capacitance line C1 is formed in a loop shape to correspond to the shape of the pixel electrode PE and is located below the pixel electrode PE.

Specifically, the storage capacitance line C1 is located below the main pixel electrode PA1, below the main pixel electrode PA2, below the contact portion PC, below the connection portion PD1, and below the connection portion PD2. However, the second electrode portion D2 of the drain electrode WD intervenes partly between the storage capacitance line C1 and the main pixel electrode PA1. The third electrode portion D3 of the drain electrode WD intervenes partly between the storage capacitance line C1 and the main pixel electrode PA2. The connection electrode portion DE of the drain electrode WD intervenes partly between the storage capacitance line C1 and the contact portion PC. The first electrode portion D1 of the drain electrode WD intervenes partly between the storage capacitance line C1 and the connection portion PD1. The drain electrode WD does not intervene between the storage capacitance line C1 and the connection portion PD2.

Also in such a structure example, the same advantageous effects as in the above-described structure example can be obtained. According to this structure example, a higher capacitance can be formed. Moreover, the redundancy for the breakage of the storage capacitance line C1 can be improved.

Figure 13:
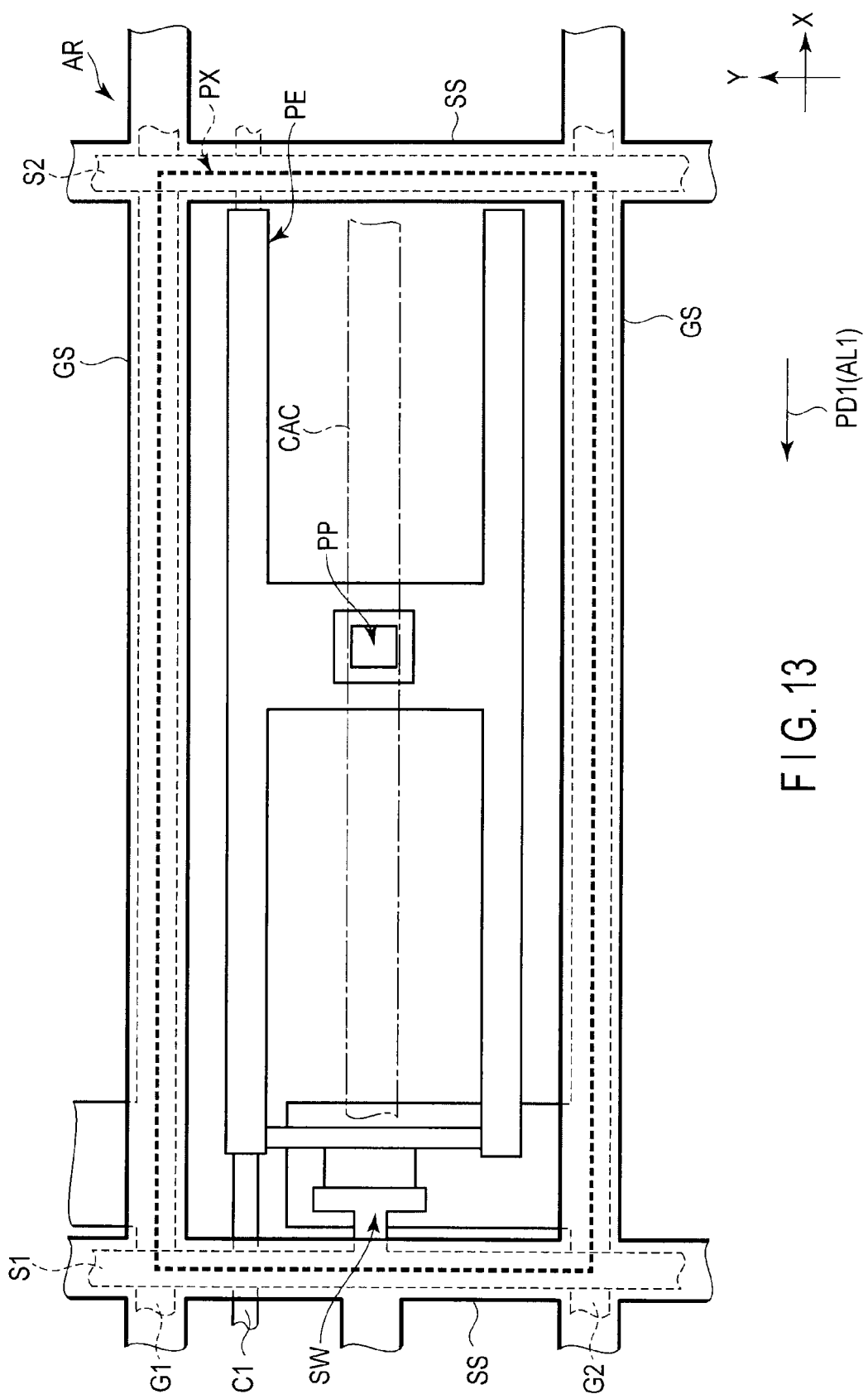
FIG. 13 is a plan view which schematically shows another structure example of the pixel at a time when the array substrate shown in FIG. 1 is viewed from the counter-substrate side.

FIG. 13 is a plan view which schematically shows another structure example of the pixel PX at a time when the array substrate AR shown in FIG. 1 is viewed from the counter-substrate side.

The structure example illustrated in FIG. 13 differs from the structure example shown in FIG. 8 in that the array substrate AR includes a gate shield electrode GS and a source shield electrode SS.

Specifically, the gate shield electrode GS is opposed to each of the gate line G1 and gate line G2 (or the gate shield electrode GS is located immediately above each of the gate line G1 and gate line G2). The gate shield electrode GS linearly extends in the first direction X, and is formed in a strip shape. The width of the gate shield electrode GS in the second direction Y may not necessarily be uniform. The gate shield electrode GS is electrically connected to the common electrode CE, and has the same potential as the common electrode CE.

The source shield electrode SS is opposed to each of the source line S1 and the source line S2 (or the source shield electrode SS is located immediately above each of the source line S1 and the source line S2). The source shield electrode SS linearly extends in the second direction Y, and is formed in a strip shape. The width of the source shield electrode SS in the first direction X may not necessarily be uniform. The source shield electrode SS is electrically connected to the common electrode CE, and has the same potential as the common electrode CE. In the example illustrated, the gate shield electrode GS and the source shield electrode SS are formed integral or continuous with each other.

Since the gate shield electrode GS and the source shield electrode SS are formed on an upper surface of the third insulation film 13 that is in the same layer as the pixel electrode PE, the gate shield electrode GS and the source shield electrode SS can be formed of the same material (e.g. ITO) as the pixel electrode PE.

When the array substrate AR of this structure example is combined with the counter-substrate CT shown in FIG. 3, the gate shield electrode GS is opposed to the main common electrode CAU and the main common electrode CAB, and the source shield electrode SS is opposed to the sub-common electrode CBL and the sub-common electrode CBR.

According to this structure example, since the gate shield electrode GS is opposed to the gate line G, an undesired electric field from the gate line G can be shielded. It is thus possible to suppress application of an undesired bias from the gate line G to the liquid crystal layer LQ, and to suppress the occurrence of a display defect such as burn-in, and the occurrence of light leakage due to an alignment defect of liquid crystal molecules.

Moreover, since the source shield electrode SS is opposed to the source line S, an undesired electric field from the source line S can be shielded. It is thus possible to suppress application of an undesired bias from the source line S to the liquid crystal layer LQ, and to suppress the occurrence of a display defect such as crosstalk (e.g. a phenomenon that when a pixel potential for displaying white is supplied to the source line that is connected to the pixel PX in the state in which the pixel PX is set at a pixel potential for displaying black, light leaks from a part of the pixel PX and the brightness increases).

Besides, since the gate shield electrode GS and source shield electrode SS, which are provided on the array substrate AR, are electrically connected and formed in a grid shape on the array substrate AR, redundancy can be improved. In addition, since the main common electrodes CA and sub-common electrodes CB, which are provided on the counter-substrate CT, are electrically connected and formed in a grid shape, redundancy can be improved. Since the gate shield electrode GS and source shield electrode SS on the array substrate AR side and the main common electrode CA and sub-common electrode CB on the counter-substrate CT side are electrically connected to each other, even if breakage occurs in a part of these electrodes, the common potential can stably be supplied to each pixel PX, and the occurrence of a display defect can be suppressed.

In each of the structure examples described above, the above-mentioned gate shield electrode GS and source shield electrode SS may be applied.

Next, other structure examples are described. The structure examples described below differ from the structure examples described above in that a plurality of storage capacitance lines C are disposed per pixel to form a capacitance between the storage capacitance lines C and the pixel electrode PE. The differences between these structure examples and the above-described structure examples are mainly described below.

Figure 14:
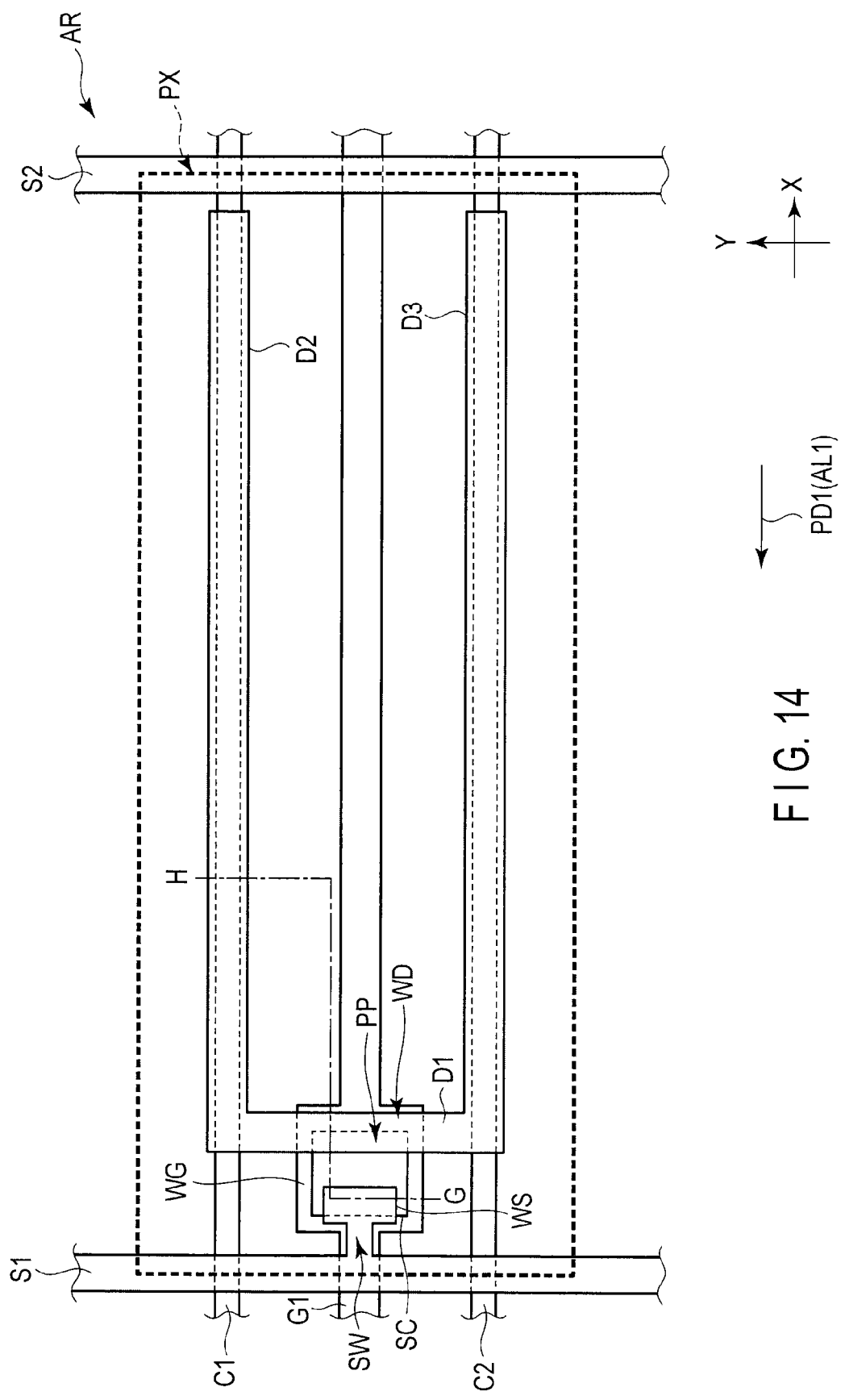
FIG. 14 is a plan view which schematically shows another structure example of the pixel at a time when the array substrate shown in FIG. 1 is viewed from the counter-substrate side.

FIG. 14 is a plan view which schematically shows another structure example of the pixel PX at a time when the array substrate shown in FIG. 1 is viewed from the counter-substrate side. FIG. 14 shows a plan view in the X-Y plane.

In the pixel PX shown, the storage capacitance line C1 and storage capacitance line C2 are disposed with the first pitch along the second direction Y, and each of the storage capacitance line C1 and storage capacitance line C2 extends in the first direction X. The gate line G1 is located between the storage capacitance line C1 and storage capacitance line C2, and extends in the first direction X. The source line S1 and source line S2 are disposed with the second pitch along the first direction X, and each of the source line S1 and source line S2 extends in the second direction Y. The length of the pixel PX in the first direction X corresponds to the second pitch between the source lines. The storage capacitance line C1 is disposed in the region of the pixel PX above the gate line G1, and the storage capacitance line C2 is disposed in the region of the pixel PX below the gate line G1. The length of the pixel PX in the second direction Y is greater than the first pitch between the storage capacitance lines. The first pitch is less than the second pitch.

Furthermore, in the pixel PX shown, the gate line G1 is located at a substantially middle point between the storage capacitance line C1 and storage capacitance line C2, or located in the center of the pixel. Specifically, the distance in the second direction Y between the storage capacitance line C1 and the gate line G1 is substantially equal to the distance in the second direction Y between the storage capacitance line C2 and the gate line G1.

The drain electrode WD of the switching element SW is located between the source line S1 and source line S2 which neighbor each other. The drain electrode WD also functions as the pixel electrode PE.

The drain electrode WD includes a first electrode portion D1 which is put in contact with the semiconductor layer SC, a second electrode portion D2 which is connected to the first electrode portion D1 and which extends along the first direction X, and a third electrode portion D3 which is connected to the first electrode portion D1 and which extends along the first direction X. The first electrode portion D1, second electrode portion D2 and third electrode portion D3 are formed integral or continuous with one another, and are electrically connected to one another.

The first electrode portion D1 is located in the vicinity of the left side end portion of the pixel PX, and linearly extends along the second direction Y. A part of the first electrode portion D1, in particular, a part (contact position) located at a substantially equal distance from the second electrode portion D2 and third electrode portion D3 contacts the semiconductor layer SC. The part of the first electrode portion D1 which contacts the semiconductor layer SC is substantially parallel to the part of the source electrode WS which contacts the semiconductor layer SC, and extends along the second direction Y. The first electrode portion D1 is formed in a strip shape having a substantially uniform width in the first direction X.

The second electrode portion D2 and third electrode portion D3 linearly extend from the first electrode portion D1 along the first direction X. Specifically, each of the second electrode portion D2 and third electrode portion D3 extends along the first direction X from the vicinity of the left side end portion (i.e. the source line S1 side) of the pixel PX to the vicinity of the right side end portion (i.e. the source line S2 side). The second electrode portion D2 and third electrode portion D3 are formed in a strip shape having a substantially uniform width in the second direction Y. In the example illustrated, the first electrode portion D1 is connected to one end portion of each of the second electrode portion D2 and third electrode portion D3 on the source line S1 side of the pixel PX.

In this drain electrode WD, the second electrode portion D2 is opposed to the storage capacitance line C1. Specifically, the storage capacitance line C1 passes immediately below the second electrode portion D2 and linearly extends along the first direction X. The third electrode portion D3 is opposed to the storage capacitance line C2. Specifically, the storage capacitance line C2 passes immediately below the third electrode portion D3 and linearly extends along the first direction X. The drain electrode WD is opposed to the storage capacitance line C1 in the second electrode portion D2 and is opposed to the storage capacitance line C2 in the third electrode portion D3, and forms a capacitance necessary for image display in the pixel PX. Nevertheless, it is preferable that the storage capacitance line C1 extends immediately below the drain electrode WD without running out of the drain electrode WD so that the area of a transmissive region in the pixel PX may not be reduced.

Figure 15:
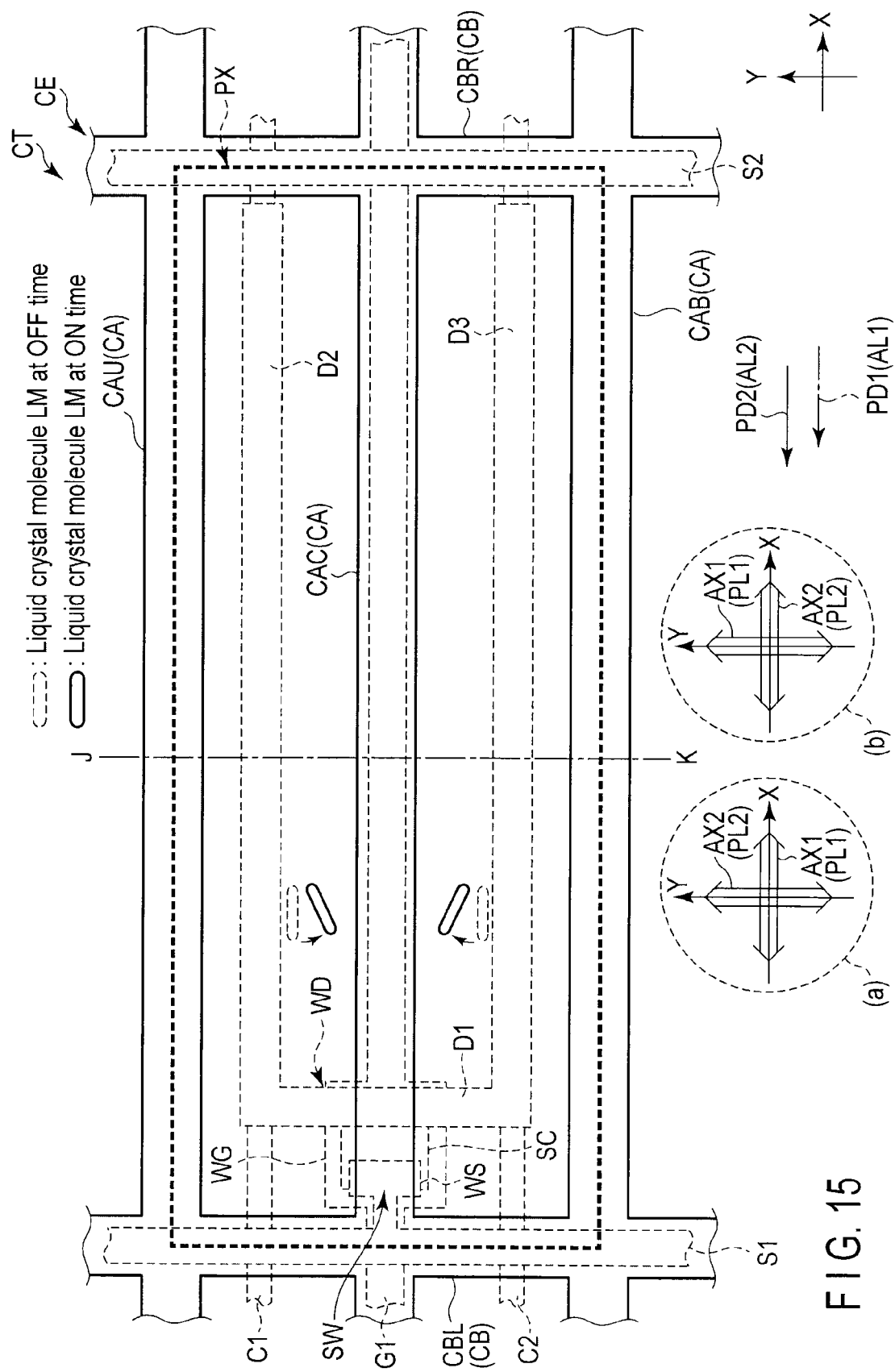
FIG. 15 is a plan view which schematically shows a structure example of the pixel in the counter-substrate shown in FIG. 1.

FIG. 15 is a plan view which schematically shows another structure example of the pixel PX in the counter-substrate CT shown in FIG. 1. FIG. 15 shows a plan view in the X-Y plane. FIG. 15 only shows structural parts that are necessary for the description, and the gate line G, storage capacitance line C, source line S and switching element SW, which are provided on the array substrate shown in FIG. 14, are indicated by broken lines.

In the X-Y plane, the main common electrodes CA are respectively located on both sides of the second electrode portion D2 of the drain electrode WD and on both sides of the third electrode portion D3, and linearly extend in the first direction X. In other words, the main common electrodes CA are disposed between the second electrode portion D2 and third electrode portion D3, at the upper side end portion of the pixel PX, and lower side end portion of the pixel PX, and extend in the first direction X. The main common electrode CA is formed in a strip shape having a substantially uniform width in the second direction Y.

In the example illustrated, the main common electrode CAU is disposed to extend over a boundary between the pixel PX and a pixel neighboring on the upper side, and the main common electrode CAB is disposed to extend over a boundary between the pixel PX and a pixel neighboring on the lower side. Specifically, the length of the pixel PX along the second direction Y corresponds to a pitch along the second direction Y between the main common electrode CAU and the main common electrode CAB. The main common electrode CAC is located between the second electrode portion D2 and the third electrode portion D3, or located in and overlaps the upper layer of the gate line G1.

The main common electrode CAU and the main common electrode CAC are located on both sides of the second electrode portion D2 and the storage capacitance line C1. Similarly, the main common electrode CAC and the main common electrode CAB are located on both sides of the third electrode portion D3 and the storage capacitance line C2. In other words, one main common electrode CAC disposed in the center of the pixel is located at a substantially middle point between the second electrode portion D2 and third electrode portion D3.

FIG. 16 is a schematic cross-sectional view, taken along the line G-H in FIG. 14, showing a cross-sectional structure of the array substrate AR. Basically, the cross-sectional structure shown in FIG. 16 is the same as the cross-sectional structure shown in FIG. 4, but is different therefrom in that the gate electrode WG of the switching element SW is a part of the gate line G1.

Figure 17:
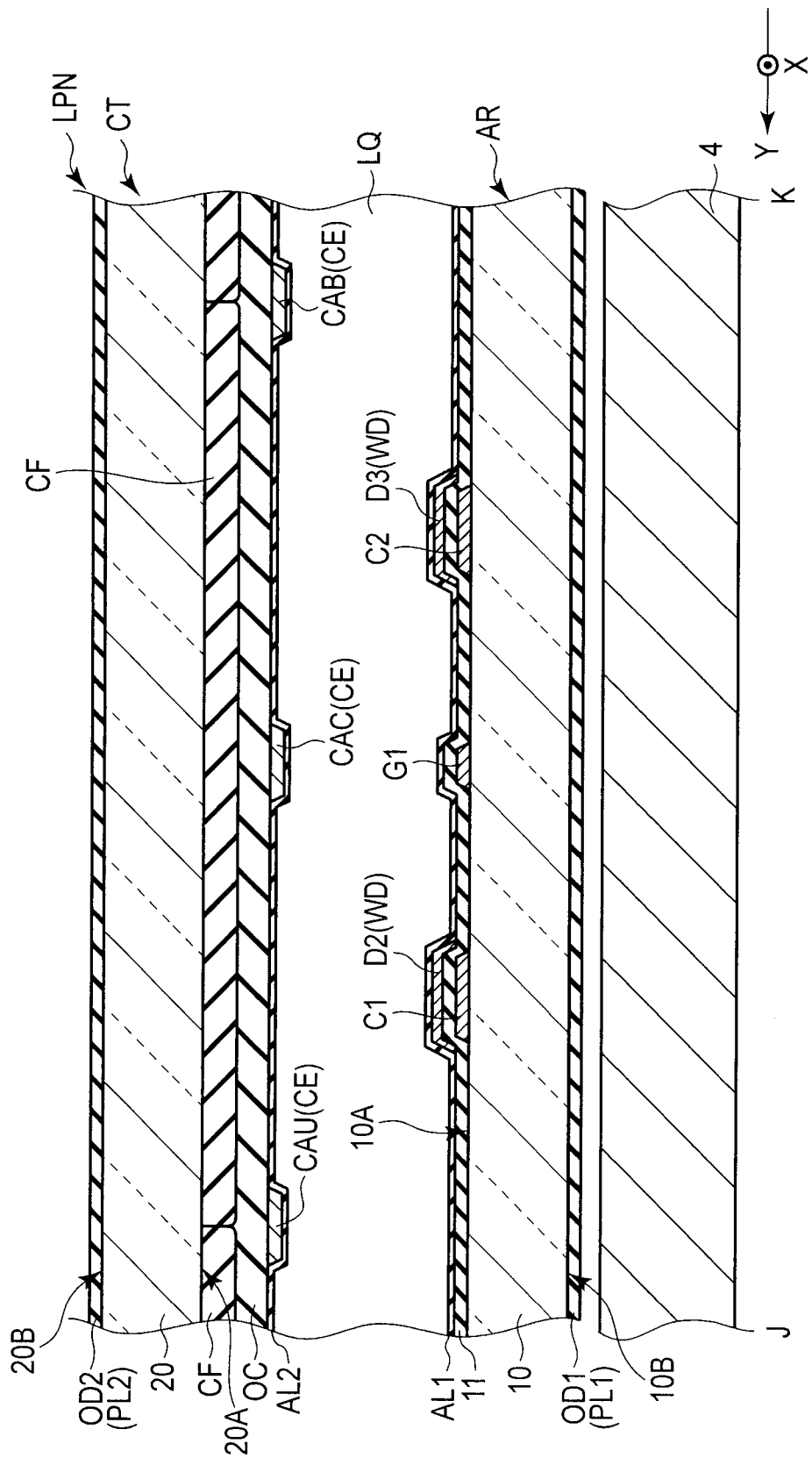
FIG. 17 is a schematic cross-sectional view, taken along the line J-K in FIG. 15, showing a cross-sectional structure of the liquid crystal display panel.

FIG. 17 is a schematic cross-sectional view, taken along the line J-K in FIG. 15, showing a cross-sectional structure of the liquid crystal display panel LPN.

In the array substrate AR, the gate line G1, storage capacitance line C1 and storage capacitance line C2 are formed on the inner surface 10A of the first insulative substrate 10, and are covered with the first insulation film 11. The second electrode portion D2 and third electrode portion D3 of the drain electrode WD are located on both sides of the gate line G1. The second electrode portion D2 is located above the storage capacitance line C1, and is disposed to overlap the storage capacitance line C1 via the first insulation film 11. The third electrode portion D3 is located above the storage capacitance line C2, and is disposed to overlap the storage capacitance line C2 via the first insulation film 11.

In the counter-substrate CT, the main common electrode CAU, main common electrode CAC and main common electrode CAB of the common electrode CE, and the sub-common electrode CB (not shown) are formed on the side of the overcoat layer OC, which is opposed to the array substrate AR. Each of the main common electrode CAU and main common electrode CAB is located below the boundary between the neighboring color filters. The main common electrode CAC is located between the main common electrode CAU and main common electrode CAB or between the second electrode portion D2 and third electrode portion D3, or is located above the gate line G1.

Also in the structure examples shown in FIG. 14 to FIG. 17, the same advantageous effects as in the above-described structure examples can be obtained.

In addition, one gate line G is located in the center of the pixel PX, and two storage capacitance lines C are located per pixel PX on both sides of the gate line G and form a capacitance necessary for image display in each pixel PX between these storage capacitance lines C and the drain electrode WD. Therefore, it is not necessary to draw the storage capacitance line C around in the pixel PX, and a space necessary for the capacitance formation can be secured. Since the gate line G is located immediately below the main common electrode CAC serving as a non-transmissive region in the pixel PX, the area of the transmissive region is not reduced even if the gate line G is located in the center of the pixel PX.

Figure 18:
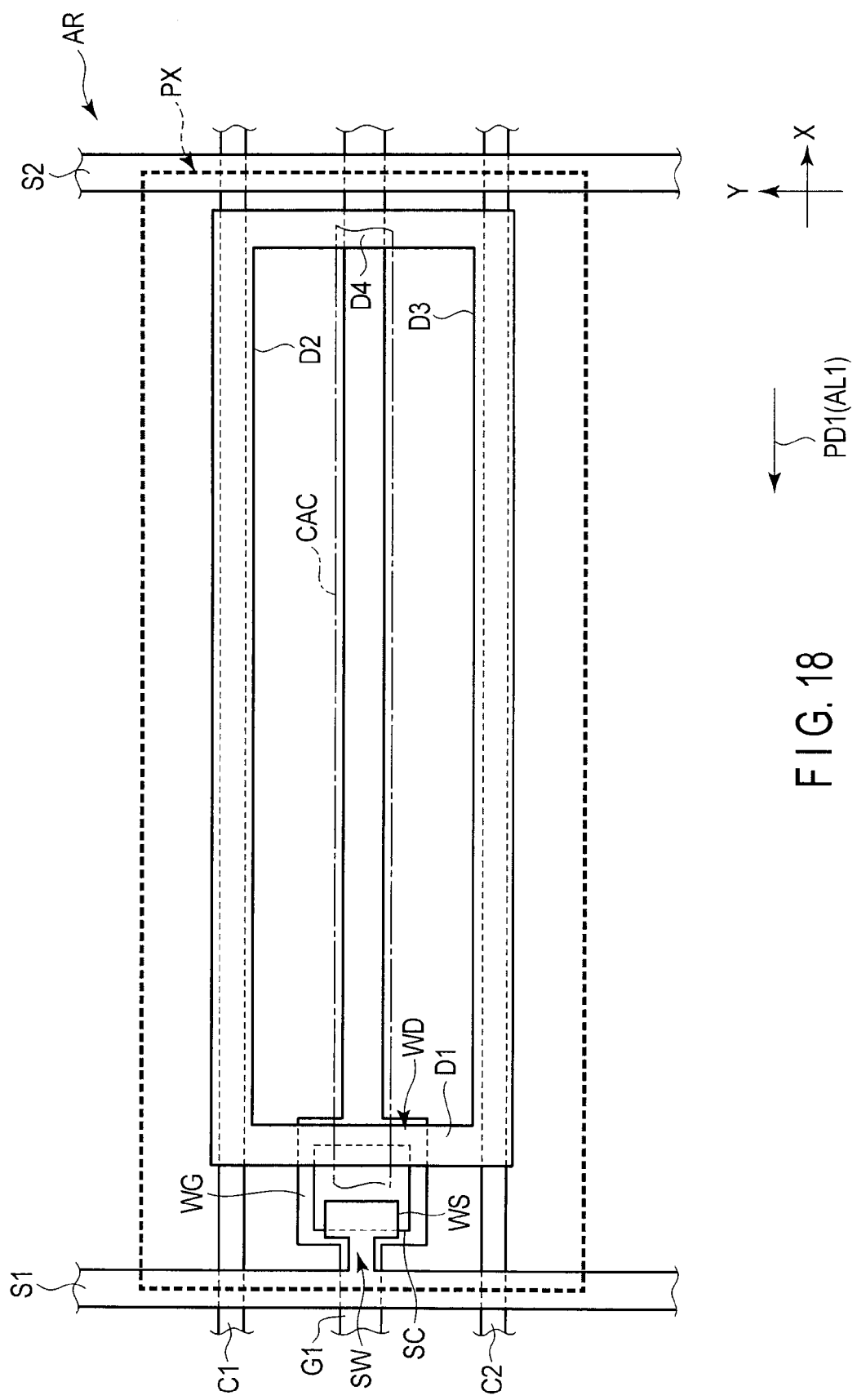
FIG. 18 is a plan view which schematically shows another structure example of the pixel at a time when the array substrate shown in FIG. 1 is viewed from the counter-substrate side.

FIG. 18 is a plan view which schematically shows another structure example of the pixel PX at a time when the array substrate AR shown in FIG. 1 is viewed from the counter-substrate side.

The structure example illustrated in FIG. 18 differs from the structure example shown in FIG. 14 in that the drain electrode WD is formed in a loop shape. Specifically, the drain electrode WD includes a second electrode portion D2, a third electrode portion D3, a first electrode portion D1 which is connected to one end of each of the second electrode portion D2 and the third electrode portion D3 and which contacts the semiconductor layer SC and which extends along the second direction Y, and a fourth electrode portion D4 which is connected to the other end of each of the second electrode portion D2 and third electrode portion D3 and which extends along the second direction Y. The first electrode portion D1 is located in the vicinity of the left side end portion of the pixel PX, while the fourth electrode portion D4 is located in the vicinity of the right side end portion of the pixel PX, that is, located on the source line S2 side, and linearly extends along the second direction Y. The fourth electrode portion D4 is formed in a strip shape having a substantially uniform width in the first direction X. The drain electrode WD having such a configuration has a rectangular shape.

The counter-substrate CT shown in FIG. 15 can be combined with the array substrate AR in such a structure example. In this case, the main common electrode CAC is located between the second electrode portion D2 and the third electrode portion D3.

Also in such a structure example, the same advantageous effects as in the above-described structure example can be obtained. According to this structure example, since the drain electrode WD is formed in a loop shape, redundancy for the breakage of the drain electrode WD can be improved. Specifically, even if a part of the drain electrode WD is broken, other paths can be used to supply a pixel potential to both the second electrode portion D2 and the third electrode portion D3 which substantially function as pixel electrodes. Thus, the deterioration of display quality, e.g. a display defect resulting from the breakage of the pixel PX can be inhibited even if the width of the electrode is considerably reduced in response to requests for higher definition.

Figure 19:
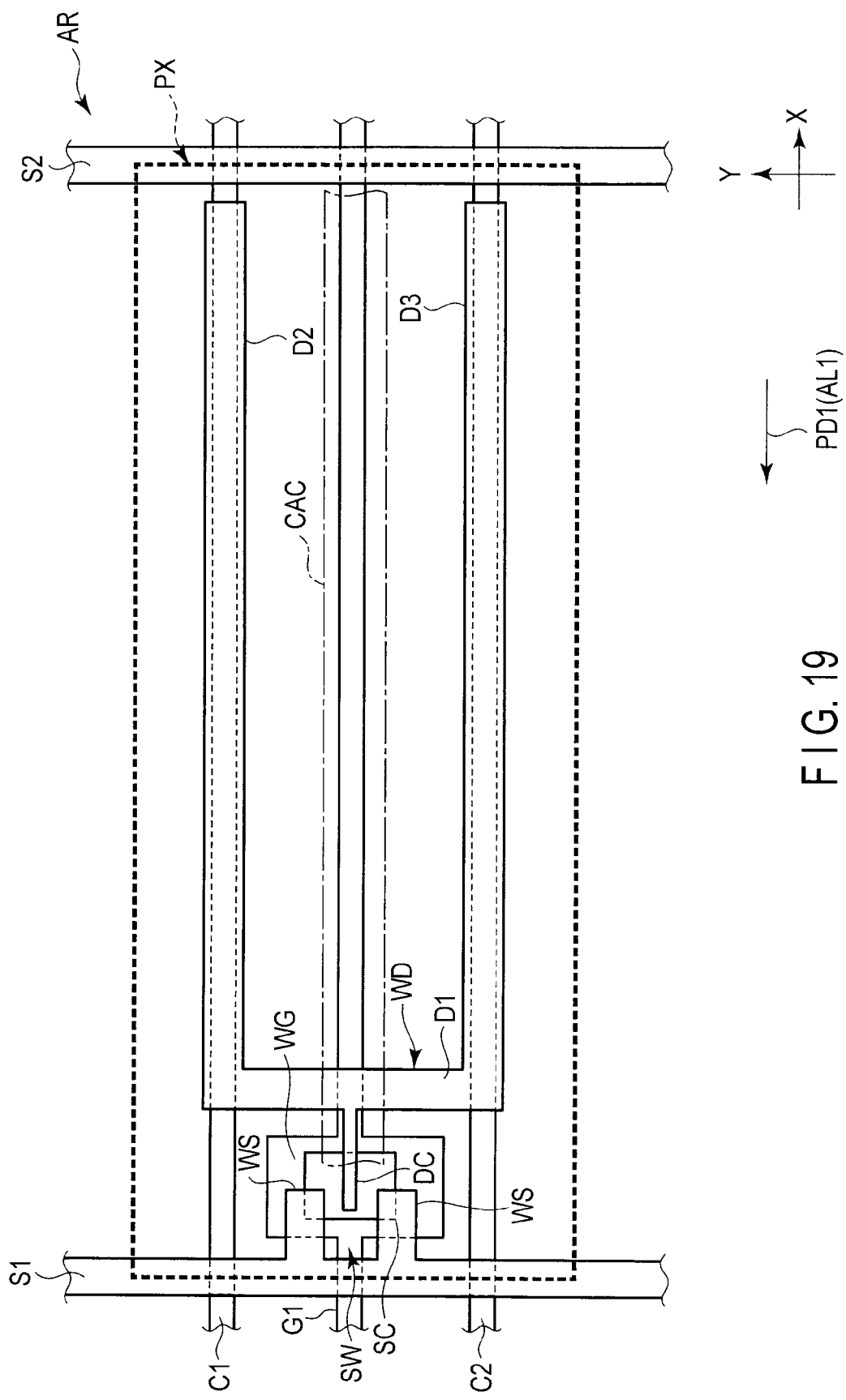
FIG. 19 is a plan view which schematically shows another structure example of the pixel at a time when the array substrate shown in FIG. 1 is viewed from the counter-substrate side.

FIG. 19 is a plan view which schematically shows another structure example of the pixel PX at a time when the array substrate AR shown in FIG. 1 is viewed from the counter-substrate side.

The structure example illustrated in FIG. 19 differs from the structure example shown in FIG. 14 in the structure of the switching element SW. Specifically, the source electrode WS integral with the source line S1 extends along the first direction X, and contacts the semiconductor layer SC at two points. The first electrode portion D1 of the drain electrode WD which also functions as a pixel electrode includes a contact portion DC extending along the first direction X. The contact portion DC contacts the semiconductor layer SC between the source electrodes WS.

Also in the structure example to which the switching element SW having such a structure is applied, the same advantageous effects as in the above-described structure example can be obtained. It goes without saying that the structure of the switching element SW described here can be applied to the case in which the drain electrode WD formed in a loop shape shown in FIG. 18 is used.

All the structure examples described above correspond to the example in which the drain electrode WD also functions as a pixel electrode. The structure examples described below, however, correspond to the example in which the pixel electrode PE is provided separately from the drain electrode WD.

Figure 20:
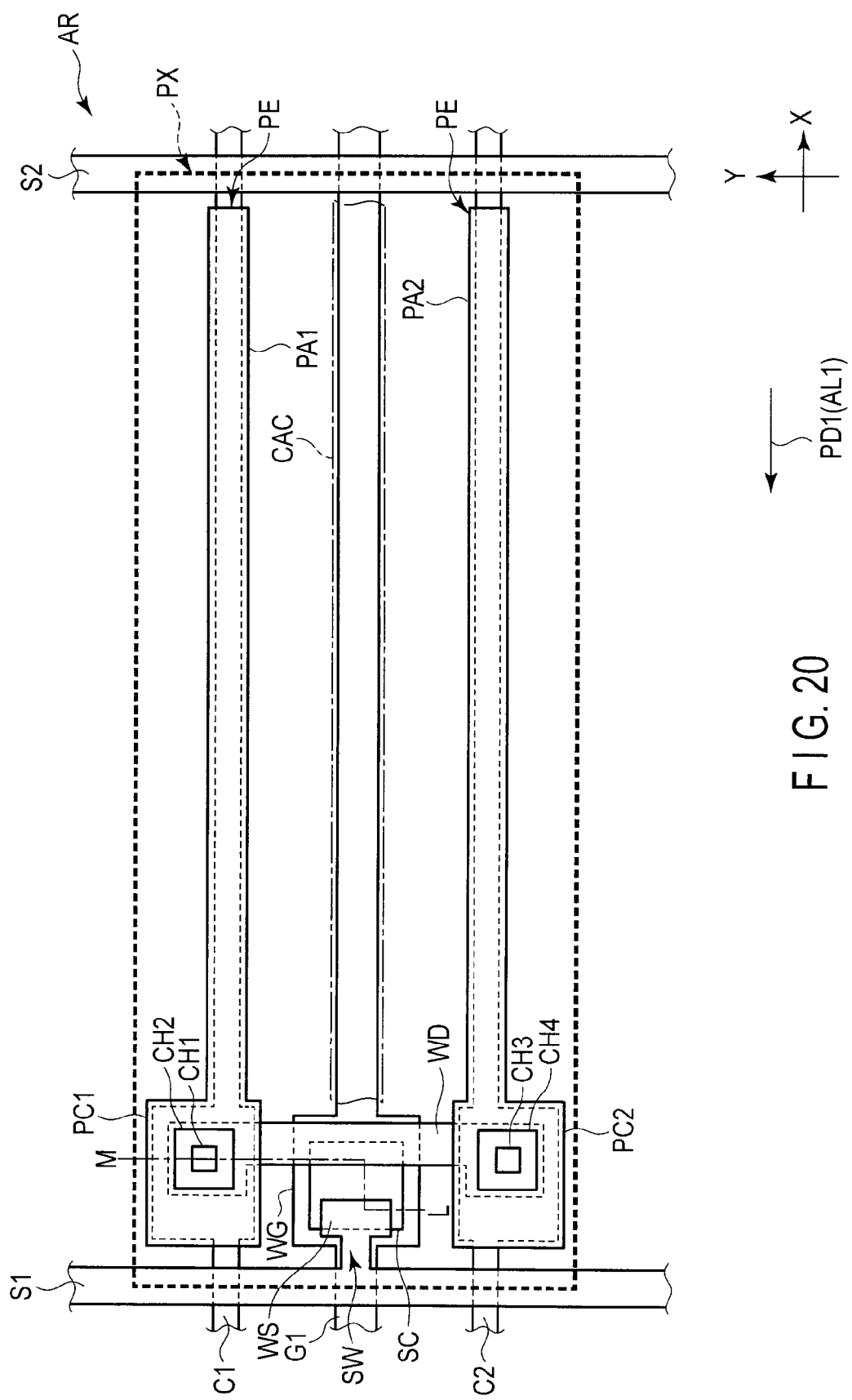
FIG. 20 is a plan view which schematically shows another structure example of the pixel at a time when the array substrate shown in FIG. 1 is viewed from the counter-substrate side.

FIG. 20 is a plan view which schematically shows another structure example of the pixel PX at a time when the array substrate AR shown in FIG. 1 is viewed from the counter-substrate side.

The structure example illustrated in FIG. 20 differs from the structure example shown in FIG. 14 in that the drain electrode WD has a different shape and in that the pixel electrode PE is provided separately from the drain electrode WD. Specifically, the drain electrode WD contacts the semiconductor layer SC, and extends along the second direction Y. In the example illustrated, one end portion of the drain electrode WD extends in a position overlapping the upper layer of the storage capacitance line C1, and the other end portion of the drain electrode WD extends in a position overlapping the upper layer of the storage capacitance line C2.

The pixel electrode PE is located between the source line S1 and source line S2 which neighbor each other, and is electrically connected to the drain electrode WD. The pixel electrode PE includes a main pixel electrode PA1 which is opposed to the storage capacitance line C1 and which extends along the first direction X, and a main pixel electrode PA2 which is opposed to the storage capacitance line C2 and which extends along the first direction X. The main pixel electrode PA1 includes a contact portion PC1. The contact portion PC1 is located above one end portion of the drain electrode WD, and is electrically connected to the drain electrode WD via the contact hole CH1 and the contact hole CH2. Similarly, the main pixel electrode PA2 includes a contact portion PC2. The contact portion PC2 is located above the other end portion of the drain electrode WD, and is electrically connected to the drain electrode WD via a contact hole CH3 and a contact hole CH4. In the example illustrated, the main pixel electrode PA1 is located apart from the main pixel electrode PA2, but both the main pixel electrode PA1 and the main pixel electrode PA2 are electrically connected to the same drain electrode WD. Therefore, the same voltage is applied to the main pixel electrode PA1 and the main pixel electrode PA2.

The part of the main pixel electrode PA1 extending from the contact portion PC1 toward the source line S2 is opposed to the storage capacitance line C1, and is formed in a strip shape having a substantially uniform width in the second direction Y. The part of the main pixel electrode PA2 extending from the contact portion PC2 toward the source line S2 is opposed to the storage capacitance line C2, and is formed in a strip shape having a substantially uniform width in the second direction Y. The storage capacitance line C1 forms a capacitance mainly between this storage capacitance line C1 and the main pixel electrode PA1. The storage capacitance line C2 forms a capacitance mainly between this storage capacitance line C2 and the main pixel electrode PA2.

The counter-substrate CT shown in FIG. 15 can be combined with the array substrate AR in such a structure example. In this case, the main common electrode CAC is located between the second electrode portion D2 and the third electrode portion D3 or between the main pixel electrode PA1 and the main pixel electrode PA2, or is located above the gate line G1. The distance in the second direction Y between the main common electrode CAC and the main pixel electrode PA1 is substantially equal to the distance in the second direction Y between the main common electrode CAC and the main pixel electrode PA2.

Figure 21:
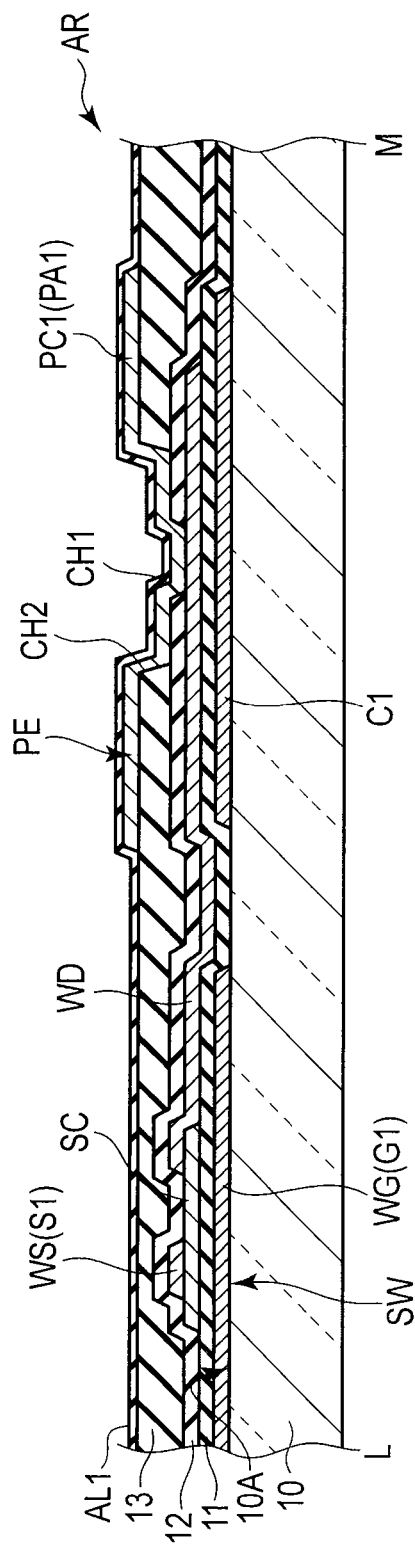
FIG. 21 is a schematic cross-sectional view, taken along the line L-M in FIG. 20, showing a cross-sectional structure of the array substrate.

FIG. 21 is a schematic cross-sectional view, taken along the line L-M in FIG. 20, showing a cross-sectional structure of the array substrate AR.

The array substrate AR includes, on the first insulative substrate 10, a switching element SW, a storage capacitance line C1, a pixel electrode PE, a first insulation film 11, a second insulation film 12, a third insulation film 13 and a first alignment film AL1. The same components as the components shown in FIG. 16 are denoted by the same reference numerals, and an overlapping description is omitted.

The gate electrode WG which is a part of the gate line G1, the storage capacitance line C1 and the storage capacitance line C2 (not shown) are formed on the inner surface 10A of the first insulative substrate 10, and are covered with the first insulation film 11. The source electrode WS which is a part of the source line S1, and the drain electrode WD contact the semiconductor layer SC formed on the first insulation film 11. The drain electrode WD extends in a position overlapping the upper layer of the storage capacitance line C1 on the first insulation film 11. Although not shown, the drain electrode WD also extends in a position overlapping the upper layer of the storage capacitance line C2 on the first insulation film 11. The semiconductor layer SC, the source electrode WS and the drain electrode WD are covered with the second insulation film 12. The contact hole CH1 pierced up to the connection electrode portion DE is formed in the second insulation film 12. Although not shown, the contact hole CH3 is also formed in the second insulation film 12.

The third insulation film 13 is formed on the second insulation film 12. The third insulation film 13 is created, for example, by forming an organic material into a film and flattening the surface thereof. The contact hole CH2 is formed in the third insulation film 13. The contact hole CH2 is larger in size than the contact hole CH1, and is pierced up to the drain electrode WD in the contact hole CH1, and is also pierced up to the second insulation film 12 around the contact hole CH1. Although not shown, the contact hole CH4 is also formed in the third insulation film 13.

The contact portion PC1 of the main pixel electrode PA1 which is the pixel electrode PE, and the contact portion PC2 of the main pixel electrode PA2 (not shown) are formed on the third insulation film 13. Specifically, the second insulation film 12 and the third insulation film 13 correspond to interlayer insulation films intervening between the source line, the source electrode as well as the drain electrode, and the pixel electrode PE. The contact portion PC1 contacts the drain electrode WD via the contact hole CH1 and the contact hole CH2. The main pixel electrode PA1 is disposed to overlap the storage capacitance line C1 via the first insulation film 11, the second insulation film 12 and the third insulation film 13. Although not shown, the main pixel electrode PA1 is disposed to overlap the storage capacitance line C1 via the first insulation film 11, the second insulation film 12 and the third insulation film 13. The pixel electrode PE and the third insulation film 13 are covered with the first alignment film AL1.

Also in such a structure example, the same advantageous effects as in the above-described structure example can be obtained. According to this structure example, the pixel electrode PE is formed on the third insulation film 13 having its surface flattened. Therefore, the effect of asperities of the surface of the array substrate AR on the alignment state of the liquid crystal molecules LM can be reduced. Moreover, it is also possible to inhibit the increase of the inter-electrode distance between the common electrode CE and the pixel electrode PE on the counter-substrate CT side.

FIG. 22 is a plan view which schematically shows another structure example of the pixel PX at a time when the array substrate AR shown in FIG. 1 is viewed from the counter-substrate side.

The structure example illustrated in FIG. 22 differs from the structure example shown in FIG. 20 in that the pixel electrode PE is formed in a loop shape. Specifically, the pixel electrode PE includes a main pixel electrode PA1, a main pixel electrode PA2, a connection portion PD1 and a connection portion PD2. Both the connection portion PD1 and connection portion PD2 extend along the second direction Y, and are formed in a strip shape having a substantially uniform width in the first direction X. In the example illustrated, the connection portion PD1 connects the main pixel electrode PA1 and the main pixel electrode PA2 on the source line S1 side of the pixel PX. The connection portion PD2 connects the main pixel electrode PA1 and the main pixel electrode PA2 on the source line S2 side of the pixel PX. The pixel electrode PE having such a configuration has a rectangular shape.

Also in such a structure example, the same advantageous effects as in the above-described structure example can be obtained. According to this structure example, since the pixel electrode PE is formed in a loop shape, redundancy for breakage can be improved.

Figure 23:
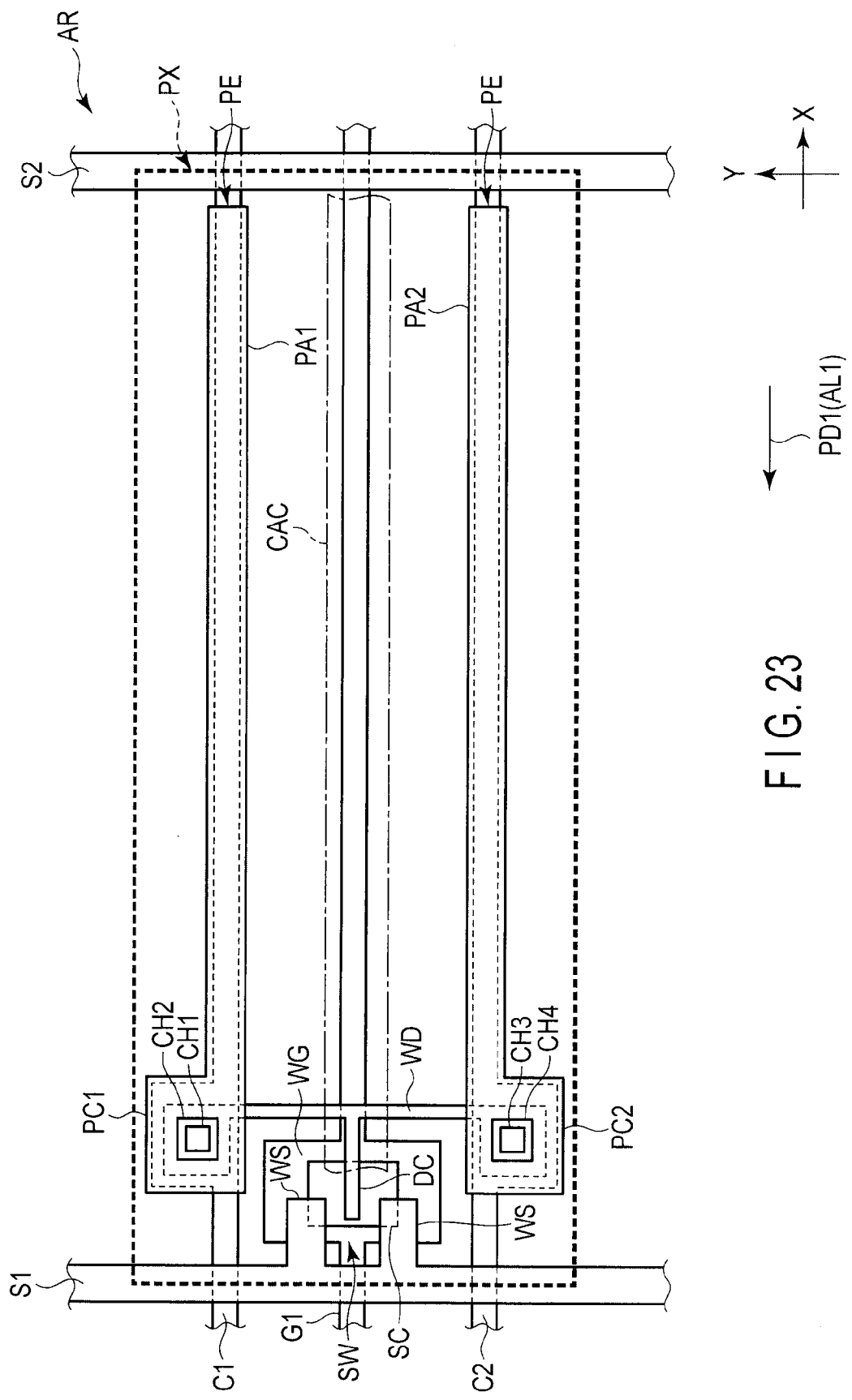
FIG. 23 is a plan view which schematically shows another structure example of the pixel at a time when the array substrate shown in FIG. 1 is viewed from the counter-substrate side.

FIG. 23 is a plan view which schematically shows another structure example of the pixel PX at a time when the array substrate AR shown in FIG. 1 is viewed from the counter-substrate side.

The structure example illustrated in FIG. 23 differs from the structure example shown in FIG. 20 in the structure of the switching element SW. Specifically, the source electrode WS integral with the source line S1 extends along the first direction X, and contacts the semiconductor layer SC at two points. The drain electrode WD includes a contact portion DC extending along the first direction X. The contact portion DC contacts the semiconductor layer SC between the source electrodes WS.

Also in the structure example to which the switching element SW having such a structure is applied, the same advantageous effects as in the above-described structure example can be obtained. The pixel electrode PE may be formed in a loop shape as is the structure example shown in FIG. 22.

Figure 24:
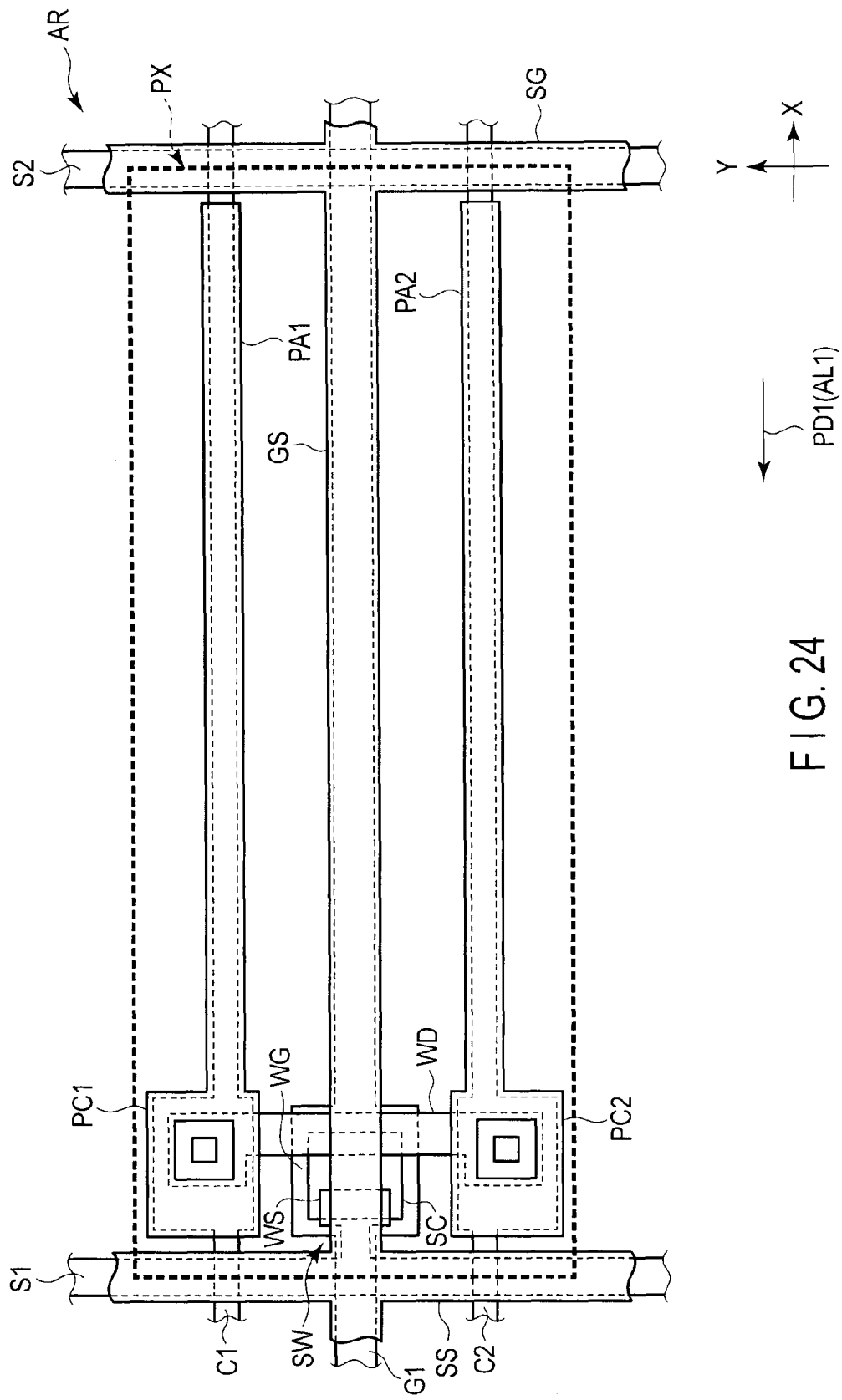
FIG. 24 is a plan view which schematically shows another structure example of the pixel at a time when the array substrate shown in FIG. 1 is viewed from the counter-substrate side.

FIG. 24 is a plan view which schematically shows another structure example of the pixel PX at a time when the array substrate AR shown in FIG. 1 is viewed from the counter-substrate side.

The structure example illustrated in FIG. 24 differs from the structure example shown in FIG. 20 in that the array substrate AR includes a gate shield electrode GS and a source shield electrode SS. Details of the gate shield electrode GS and the source shield electrode SS are as have been described with reference to FIG. 13, and a detailed description thereof is omitted here. Specifically, the gate shield electrode GS is opposed to the gate line G1 (or the gate shield electrode GS is located in and overlaps the upper layer of the gate line G1). The gate shield electrode GS linearly extends in the first direction X, and is formed in a strip shape. The gate shield electrode GS is electrically connected to the common electrode CE, and has the same potential as the common electrode CE.

The source shield electrode SS is opposed to each of the source line S1 and the source line S2 (or the source shield electrode SS is located in and overlaps the upper layers of the source line S1 and the source line S2). The source shield electrode SS linearly extends in the second direction Y, and is formed in a strip shape. The source shield electrode SS is electrically connected to the common electrode CE, and has the same potential as the common electrode CE. In the example illustrated, the gate shield electrode GS and the source shield electrode SS are formed integral or continuous with each other.

When the array substrate AR of this structure example is combined with the counter-substrate CT shown in FIG. 15, the gate shield electrode GS is opposed to the main common electrode CAC, and the source shield electrode SS is opposed to the sub-common electrode CBL and the sub-common electrode CBR.

According to this structure example, since the gate shield electrode GS is opposed to the gate line G, an undesired electric field from the gate line G can be shielded. Since the source shield electrode SS is opposed to the source line S, an undesired electric field from the source line S can be shielded. In addition, since the gate shield electrode GS and source shield electrode SS, which are provided on the array substrate AR, are electrically connected and formed in a grid shape on the array substrate AR, redundancy can be improved. Since the main common electrodes CA and sub-common electrodes CB which are provided on the counter-substrate CT, are electrically connected and formed in a grid shape, redundancy can be improved. Since the gate shield electrode GS and source shield electrode SS on the array substrate AR side and the main common electrode CA and sub-common electrode CB on the counter-substrate CT side are electrically connected to each other, even if breakage occurs in a part of these electrodes, the common potential can stably be supplied to each pixel PX, and the occurrence of a display defect can be suppressed.

In each of the structure examples described above, the above-mentioned gate shield electrode GS and source shield electrode SS may be applied.

As has been described above, according to the present embodiment, a liquid crystal display device, which can realize cost reduction and can suppress degradation in display quality, can be provided.

Other aspects of the present embodiment are additionally set forth below.

(1) A liquid crystal display device comprising:
a first substrate including a first storage capacitance line and a second storage capacitance line which extend in a first direction, a gate line which is located between the first storage capacitance line and the second storage capacitance line and which extends in the first direction, a source line which extends in a second direction crossing the first direction, a semiconductor layer, a gate electrode which is electrically connected to the gate line, a source electrode which contacts the semiconductor layer and which is electrically connected to the source line, a drain electrode which contacts the semiconductor layer, and a pixel electrode including a first main pixel electrode which is electrically connected to the drain electrode and which is opposed to the first storage capacitance line and which extends in the first direction, and a second main pixel electrode which is electrically connected to the drain electrode and which is opposed to the second storage capacitance line and which extends in the first direction;

a second substrate including a common electrode, the common electrode including main common electrodes which are located, respectively, on both sides of the first main pixel electrode and on both sides of the second main pixel electrode and which extend in the first direction; and a liquid crystal layer including liquid crystal molecules held between the first substrate and the second substrate.

(2) The liquid crystal display device according to (1), wherein the main common electrode between the first main pixel electrode and the second main pixel electrode is located above the gate line.

(3) The liquid crystal display device according to (1) or (2), wherein the pixel electrode is formed in a loop shape.

(4) The liquid crystal display device according to any one of (1) to (3), wherein the first substrate further includes a gate shield electrode which is opposed to the gate line and which has the same potential as the common electrode, and a source shield electrode which is opposed to the source line and which has the same potential as the common electrode.

(5) The liquid crystal display device according to any one of (1) to (4), wherein the gate line is located at a substantially middle point between the first storage capacitance line and the second storage capacitance line.

(6) A liquid crystal display device comprising:
a first substrate including a first storage capacitance line and a second storage capacitance line which extend in a first direction, a gate line which is located between the first storage capacitance line and the second storage capacitance line and which extends in the first direction, a gate electrode which is electrically connected to the gate line, a first insulation film which covers the first storage capacitance line, the second storage capacitance line, the gate line, and the gate electrode, a semiconductor layer which is formed on the first insulation film and which is located above the gate electrode, a source line which is formed on the first insulation film and which extends in a second direction crossing the first direction, a source electrode which is electrically connected to the source line on the first insulation film and which contacts the semiconductor layer, a drain electrode which is formed on the first insulation film and which contacts the semiconductor layer, a second insulation film which covers the semiconductor layer, the source line, the source electrode, and the drain electrode, and a pixel electrode which is formed on the second insulation film, the pixel electrode including a first main pixel electrode which is electrically connected to the drain electrode and which extends in the first direction to overlap the first storage capacitance line via the first insulation film and the second insulation film, and a second main pixel electrode which is electrically connected to the drain electrode and which extends in the first direction to overlap the second storage capacitance line via the first insulation film and the second insulation film;
a second substrate including a common electrode, the common electrode including main common electrodes which are located, respectively, on both sides of the first main pixel electrode and on both sides of the second main pixel electrode and which extend in the first direction; and
a liquid crystal layer including liquid crystal molecules held between the first substrate and the second substrate.

(7) The liquid crystal display device according to (6), wherein the first substrate further includes a gate shield electrode which is formed on the second insulation film and which is opposed to the gate line and which has the same potential as the common electrode, and a source shield electrode which is formed on the second insulation film and which is opposed to the source line and which has the same potential as the common electrode.

(8) The liquid crystal display device according to any one of (1) to (7), wherein the second substrate further includes sub-common electrodes which are connected to the main common electrodes and which extend in the second direction.

(9) The liquid crystal display device according to any one of (1) to (8), wherein a pixel in which the drain electrode is disposed is in a laterally elongated shape having a greater length in the first direction than in the second direction.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A liquid crystal display device comprising:
a first substrate including a first gate line and a second gate line which extend in a first direction and which are disposed with a first pitch along a second direction crossing the first direction, a first source line and a second source line which extend in the second direction and which are disposed with a second pitch, which is greater than the first pitch, along the first direction, a semiconductor layer, a gate electrode electrically connected to the first gate line, a source electrode which contacts the semiconductor layer and which is electrically connected to the first source line, a drain electrode which is formed of the same material as the first source line and the second source line, the drain electrode including a first electrode portion which contacts the semiconductor layer, a second electrode portion which is connected to the first gate line side of the first electrode portion and which extends in the first direction, and a third electrode portion which is connected to the second gate line side of the first electrode portion and which extends in the first direction, and a storage capacitance line which passes below at least one of the second electrode portion and the third electrode portion between the first gate line and the second gate line and which extends in the first direction;
a second substrate including a common electrode, the common electrode including main common electrodes which extend in the first direction and which are located, respectively, between the second electrode portion and the third electrode portion, above the first gate line, and above the second gate line; and
a liquid crystal layer including liquid crystal molecules held between the first substrate and the second substrate.

2. The liquid crystal display device according to claim 1, wherein the first substrate further includes a pixel electrode which is electrically connected to the drain electrode, and
the pixel electrode includes a first main pixel electrode which is located above the second electrode portion and which extends in the first direction, and a second main pixel electrode which is located above the third electrode portion and which extends in the first direction.

3. The liquid crystal display device according to claim 2, wherein the drain electrode includes connection electrode portions which are respectively connected to the second electrode portion and the third electrode portion and which extend in the second direction, and the drain electrode is formed in a loop shape, and
the pixel electrode includes contact portions, the contact portions being located above the connection electrode portions, contacting the connection electrode portions, being respectively connected to the first main pixel electrode and the second main pixel electrode, and extending in the second direction.

4. The liquid crystal display device according to claim 3, wherein the pixel electrode is formed in a loop shape.

5. The liquid crystal display device according to claim 1, wherein the first substrate further includes gate shield electrodes which are respectively opposed to the first gate line and the second gate line and which have the same potential as the common electrode, and source shield electrodes which are respectively opposed to the first source line and the second source line and which have the same potential as the common electrode.

6. The liquid crystal display device according to claim 1, wherein the second substrate further includes sub-common electrodes which are connected to the main common electrodes and which extend in the second direction.

7. A liquid crystal display device comprising:
a first substrate including a gate line which extends in a first direction, a gate electrode electrically connected to the gate line, an insulation film which covers the gate line and the gate electrode, a semiconductor layer which is formed on the insulation film and which is located above the gate electrode, a source line which is formed on the insulation film and which extends in a second direction crossing the first direction, a source electrode which is electrically connected to the source line on the insulation film and which contacts the semiconductor layer, a drain electrode which is formed on the insulation film of a pixel having a greater length in the first direction than in the second direction, the drain electrode including a first electrode portion which contacts the semiconductor layer, and a second electrode portion and a third electrode portion which are connected to the first electrode portion and which extend in the first direction, and a storage capacitance line which passes below at least one of the second electrode portion and the third electrode portion and which is covered with the insulation film;
a second substrate including a common electrode, the common electrode including main common electrodes which extend in the first direction and which are located, respectively, between the second electrode portion and the third electrode portion, and above the gate line; and
a liquid crystal layer including liquid crystal molecules held between the first substrate and the second substrate.

8. The liquid crystal display device according to claim 7, wherein the drain electrode is formed of the same material as the source electrode.

9. The liquid crystal display device according to claim 7, wherein the first substrate further includes an interlayer insulation film which covers the source line, the source electrode, and the drain electrode, and a pixel electrode which is formed on the interlayer insulation film and which is electrically connected to the drain electrode, and
the pixel electrode includes a first main pixel electrode which is located above the second electrode portion and which extends in the first direction, and a second main pixel electrode which is located above the third electrode portion and which extends in the first direction.

10. The liquid crystal display device according to claim 9, wherein the drain electrode includes connection electrode portions which are respectively connected to the second electrode portion and the third electrode portion and which extend in the second direction, and the drain electrode is formed in a loop shape, and
the pixel electrode includes contact portions which are located above the connection electrode portions and which are respectively connected to the first main pixel electrode and the second main pixel electrode and which extend in the second direction, the drain electrode electrically connecting the pixel electrode via a contact hole, the contact hole being formed in the interlayer insulation film which intervenes between connection electrode portions and the contact portion.

11. The liquid crystal display device according to claim 9, wherein the first substrate further includes a gate shield electrode which is formed on the interlayer insulation film and which is opposed to the gate line and which has the same potential as the common electrode, and a source shield electrode which is formed on the interlayer insulation film and which is opposed to the source line and which has the same potential as the common electrode.

12. A liquid crystal display device comprising:
a first substrate including a first storage capacitance line and a second storage capacitance line which extend in a first direction, a gate line which is located between the first storage capacitance line and the second storage capacitance line and which extends in the first direction, a source line which extends in a second direction crossing the first direction, a semiconductor layer, a gate electrode which is electrically connected to the gate line, a source electrode which contacts the semiconductor layer and which is electrically connected to the source line, and a drain electrode including a first electrode portion which contacts the semiconductor layer, a second electrode portion which is connected to the first electrode portion and which is opposed to the first storage capacitance line and which extends in the first direction, and a third electrode portion which is connected to the first electrode portion and which is opposed to the second storage capacitance line and which extends in the first direction;
a second substrate including a common electrode, the common electrode including main common electrodes which are located, respectively, on both sides of the second electrode portion and on both sides of the third electrode portion and which extend in the first direction; and
a liquid crystal layer including liquid crystal molecules held between the first substrate and the second substrate.

13. The liquid crystal display device according to claim 12, wherein the main common electrode between the second electrode portion and the third electrode portion is located above the gate line.

14. The liquid crystal display device according to claim 12, wherein the drain electrode is formed in a loop shape.

15. A liquid crystal display device comprising:
a first substrate including a first storage capacitance line and a second storage capacitance line which extend in a first direction, a gate line which is located between the first storage capacitance line and the second storage capacitance line and which extends in the first direction, a gate electrode electrically connected to the gate line, an insulation film which covers the first storage capacitance line, the second storage capacitance line, the gate line, and the gate electrode, a semiconductor layer which is formed on the insulation film and which is located above the gate electrode, a source line which is formed on the insulation film and which extends in a second direction crossing the first direction, a source electrode which is electrically connected to the source line on the insulation film and which contacts the semiconductor layer, a drain electrode formed on the insulation film, the drain electrode including a first electrode portion which contacts the semiconductor layer, a second electrode portion which is connected to the first electrode portion and which extends in the first direction to overlap the first storage capacitance line via the insulation film, and a third electrode portion which is connected to the first electrode portion and which extends in the first direction to overlap the second storage capacitance line via the insulation film;
a second substrate including a common electrode, the common electrode including main common electrodes which are located, respectively, on both sides of the second electrode portion and on both sides of the third electrode portion and which extend in the first direction; and a liquid crystal layer including liquid crystal molecules held between the first substrate and the second substrate.

16. The liquid crystal display device according to claim 15, wherein the drain electrode is formed of the same material as the source electrode.

* * * * *